(12) United States Patent
Kuge et al.

(10) Patent No.: US 12,587,954 B2
(45) Date of Patent: Mar. 24, 2026

(54) USER EQUIPMENT (UE)

(71) Applicant: SHARP KABUSHIKI KAISHA, Sakai City (JP)

(72) Inventors: Yoko Kuge, Sakai City (JP); Yasuo Sugawara, Sakai City (JP); Yudai Kawasaki, Sakai City (JP); Shuichiro Chiba, Sakai City (JP); Masaki Izumi, Sakai City (JP); Masafumi Aramoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 325 days.

(21) Appl. No.: 18/267,860

(22) PCT Filed: Dec. 22, 2021

(86) PCT No.: PCT/JP2021/047605
§ 371 (c)(1),
(2) Date: Jun. 16, 2023

(87) PCT Pub. No.: WO2022/138731
PCT Pub. Date: Jun. 30, 2022

(65) Prior Publication Data
US 2024/0064620 A1 Feb. 22, 2024

(30) Foreign Application Priority Data

Dec. 22, 2020 (JP) ................................. 2020-211936

(51) Int. Cl.
*H04W 48/16* (2009.01)
(52) U.S. Cl.
CPC .................................. *H04W 48/16* (2013.01)

(58) Field of Classification Search
CPC ...... H04W 48/16; H04W 48/18; H04W 76/20
See application file for complete search history.

(56) References Cited

U.S. PATENT DOCUMENTS

2019/0058787 A1* 2/2019 Ravichandran ......... H04W 8/06
2019/0326021 A1* 10/2019 Harrod, IV ........... H04W 88/02
2020/0221281 A1* 7/2020 Rajadurai ............. H04W 76/30
2022/0070649 A1* 3/2022 Sahin .................. H04L 65/1073

OTHER PUBLICATIONS

"3rd Generation Partnership Project; Technical Specification Group Core Network and Terminals; Non-Access-Stratum (NAS) functions related to Mobile Station (MS) in idle mode (Release 17)", 3GPP TS 23.122 V17.1.0(Dec. 2020), pp. 1-90, *Section C.4.1, C.4.2*, [retrieved on Dec. 18, 2020].
NTT Docomo et al., "SOR-CMCI configuration and session handling for enhanced control plane SOR in connected mode", C1-207567, revision of C1-205954, C1-207036, 3GPP TSG-CT WG1 Meeting #126-e, Electronic meeting, Oct. 15-23, 2020.
3GPP TS 24.501 V17.1.0 (Dec. 2020) 3rd Generation Partnership Project; Technical Specification Group Core Network and Terminals; Non-Access-Stratum (NAS) protocol for 5G System (5GS); Stage 3; (Release 17).

* cited by examiner

*Primary Examiner* — Dhaval V Patel
(74) *Attorney, Agent, or Firm* — ScienBiziP, P.C.

(57) ABSTRACT

A User Equipment (UE) includes a controller. The controller is in automatic network selection mode, and the controller stops a Tsor-cm timer in a case that the controller switched to manual network selection mode and the Tsor-cm timer is running.

2 Claims, 6 Drawing Sheets

USER EQUIPMENT (UE)

TECHNICAL FIELD

The present invention relates to a User Equipment (UE).

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

Additionally, the 3GPP has recently studied next-generation communication technologies and system architectures for a 5th Generation (5G) mobile communication system which is a next generation mobile communication system, and in particular, has standardized 5G System (5GS) as a system for realizing a 5G mobile communication system (see NPL 1). In the 5GS, technical problems attributable to connection of various terminals to a cellular network are extracted to standardize solutions.

CITATION LIST

Non Patent Literature

NPL 1: 3GPP TS 24.501 V 17.1.0 (2020-12); 3rd Generation Partnership Project; Technical Specification Group Core Network and Terminals; Non-Access-Stratum (NAS) protocol for 5G System (5GS); Stage 3 (Release 17)

NPL 2: 3GPP TSG-CT WG1 Meeting #126-e, C1-207567, "SOR-CMCI configuration and session handling for enhanced control plane SOR in connected mode"

SUMMARY OF INVENTION

Technical Problem

For the 5G System (5GS), a 5G Core Network (5GCN) corresponding to a new core network has been studied in order to provide a wide variety of services.

In addition, for 5G, a network slice has been defined that corresponds to a logical network providing specific network functions and specific network characteristics for a specific service type or a specific group. For example, the network slice may be a logical network provided for terminals with a low latency function, or may be a logical network provided for sensor terminals used in the Internet of Things (IoT).

In 5G, Control plane Steering of Roaming (CP-SOR) has been introduced that realizes Steering of Roaming (SOR) in the Control plane, the SOR being a scheme and/or technique that allows a roaming UE to be prompted to roam to a prioritized roaming network (or recommended roaming network) indicated by an HPLMN.

Further, in the 3GPP, Enhanced CP-SOR has been studied, the Enhanced CP-SOR being a technique that allows a NW to configure a timing at which a UE transitions from a connected mode to an idle mode in the CP-SOR (see NPL 2). Here, the Enhanced CP-SOR may be referred to as Enhancement for the 5G Control Plane Steering of Roaming for UE in CONNECTED mode (eCPSOR CON). However, a method to satisfy the above requirements is not clear.

An aspect of the present invention is made in the light of the circumstances as described above, and provides a method of realizing a function for the eCPSOR CON in the 5GS.

Solution to Problem

A User Equipment (UE) according to an aspect of the present invention is a User Equipment (UE) including a controller. The controller is in automatic network selection mode, and the controller stops a Tsor-cm timer in a case that the controller switches to manual network selection mode and the Tsor-cm timer is running.

A method according to an aspect of the present invention is a method performed by a User Equipment (UE). The method includes, while the UE is in automatic network selection mode, stopping a Tsor-cm timer in a case that the UE switches to manual network selection mode and the Tsor-cm timer is running.

Advantageous Effects of Invention

According to an aspect of the present invention, in the 5GS, eCPSOR CON can be supported, and the NW can control the timing at which the UE transitions from the connected mode to the idle mode.

DESCRIPTION OF EMBODIMENTS

A preferred embodiment for carrying out an aspect of the present invention will be described below with reference to the drawings. Note that, as an example, an embodiment of a mobile communication system to which an aspect of the present invention is applied will be described in the present embodiment.

1. OVERVIEW OF SYSTEM

Figure 1:
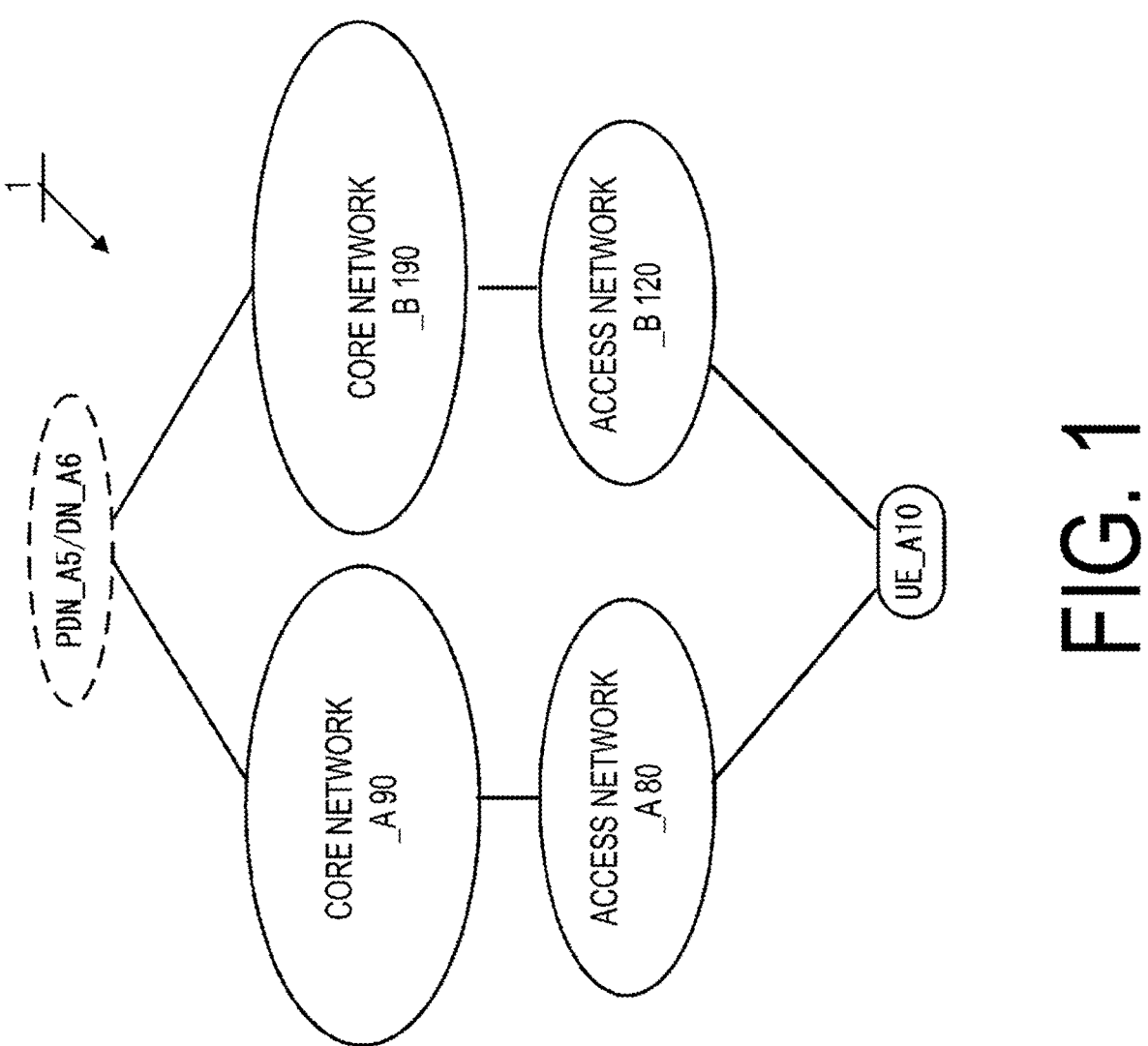
FIG. 1 is a diagram illustrating an overview of a mobile communication system (EPS/5GS).
Figure 2:
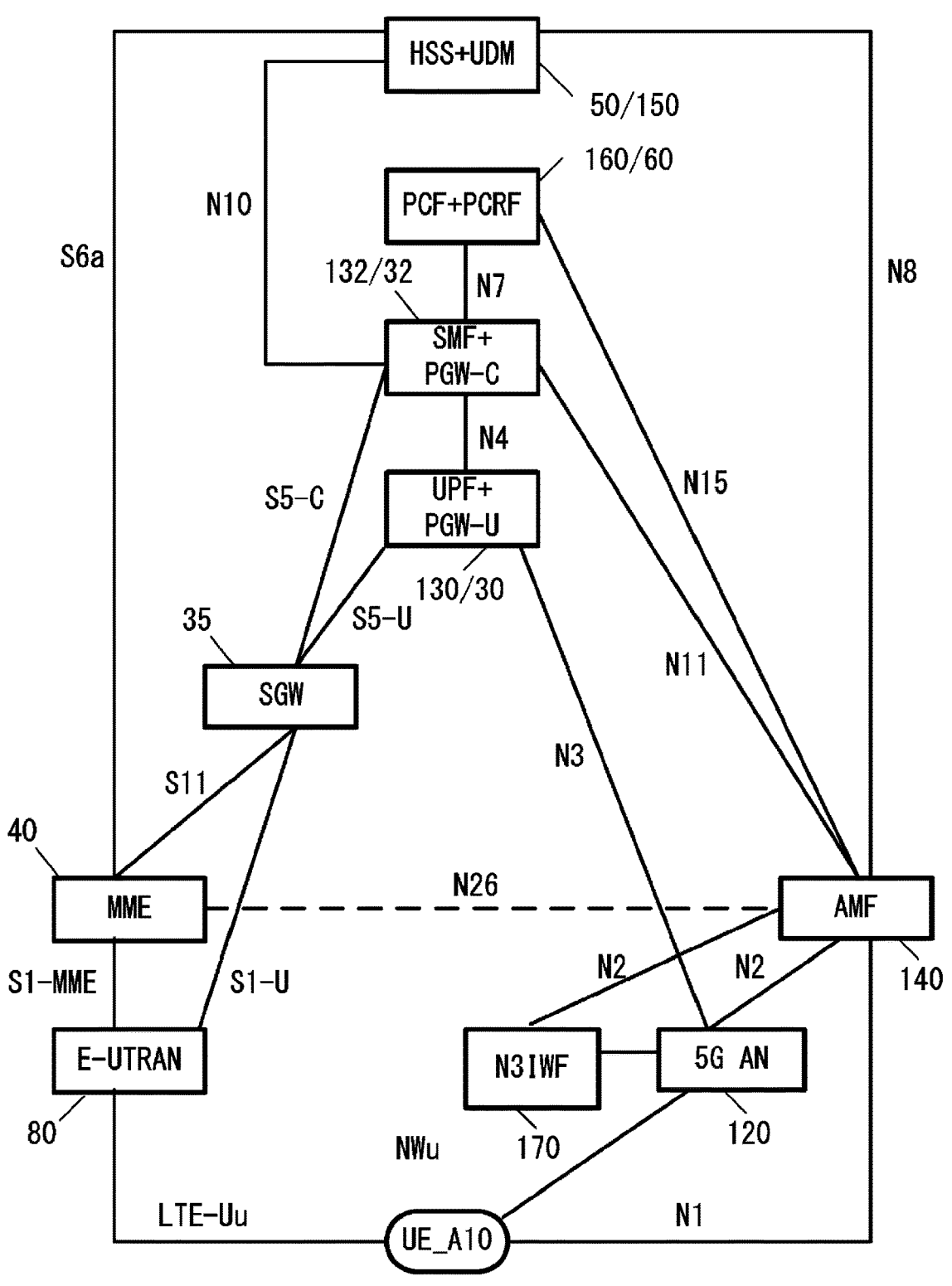
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, an UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, an UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol for the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted, such as in an eNB. The gNB is a node that provides a New Radio (NR) user plane and control plane to the UE, and is connected to a 5GCN via the NG interface (including an N2 interface or an N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or a trusted non-3GPP access network. Here, the untrusted non-3GPP access network may be a non-3GPP access network, such as a public wireless LAN, without security management performed in the access network, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a Mobile Network Operator (MNO) connecting the access network (the access network_A and/or the access network_B) and the PDN and/or the DN, a core network for a mobile network operator that operates and manages the mobile communication system 1, or a core network for a virtual mobile network operator and a virtual mobile communication service provider such as a Mobile Virtual Network Operator (MVNO) and a Mobile Virtual Network Enabler (MVNE).

The core network (core network_A and/or core network_B) and the access network (access network_A and/or access network_B) may be different for each mobile network operator.

FIG. 1 illustrates a case that the PDN and the DN are the same; however the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using IP, and data is transmitted and/or received using IP packets. The IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets. For example, non-IP communication may be data communication realized through transmission and/or reception of application data to which an IP header is not added, or user data transmitted and/or received by the UE may be transmitted and/or received with another header such as a MAC header and an Ethernet (trade name) frame header added.

Apparatuses which are not illustrated in FIG. 2 may be configured in the access network_A, the core network_A, the access network_B, the core network_B, the PDN A, and the DN_A. For example, the core network_A and/or the core network_B and/or the PDN A, and/or the DN_A may include an Authentication Server Function (AUSF) and an Authentication, authorization, and accounting (AAA) server (AAA-S). The AAA server may be deployed out of the core network.

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a 3rd party.

Note that, although each of the apparatuses and functions is illustrated individually for simplicity in FIG. 2, multiple similar apparatuses and functions may be included in the mobile communication system 1. Specifically, multiple apparatuses and functions such as the UE_As 10, the E-UTRANs 80, the MMES 40, the SGWs 35, the PGW-Us 30, the PGW-Cs 32, the PCRFs 60, the HSSs 50, the 5G ANs 120, the AMFs 140, the UPFs 130, the SMFs 132, the PCFs 160, and/or the UDMs 150 may be included in the mobile communication system 1.

2. CONFIGURATION OF EACH APPARATUS

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over an N26 interface but also information transmitted and/or received without using the N26 interface can be stored.

2.1. Apparatus Configuration of UE

Figure 3:
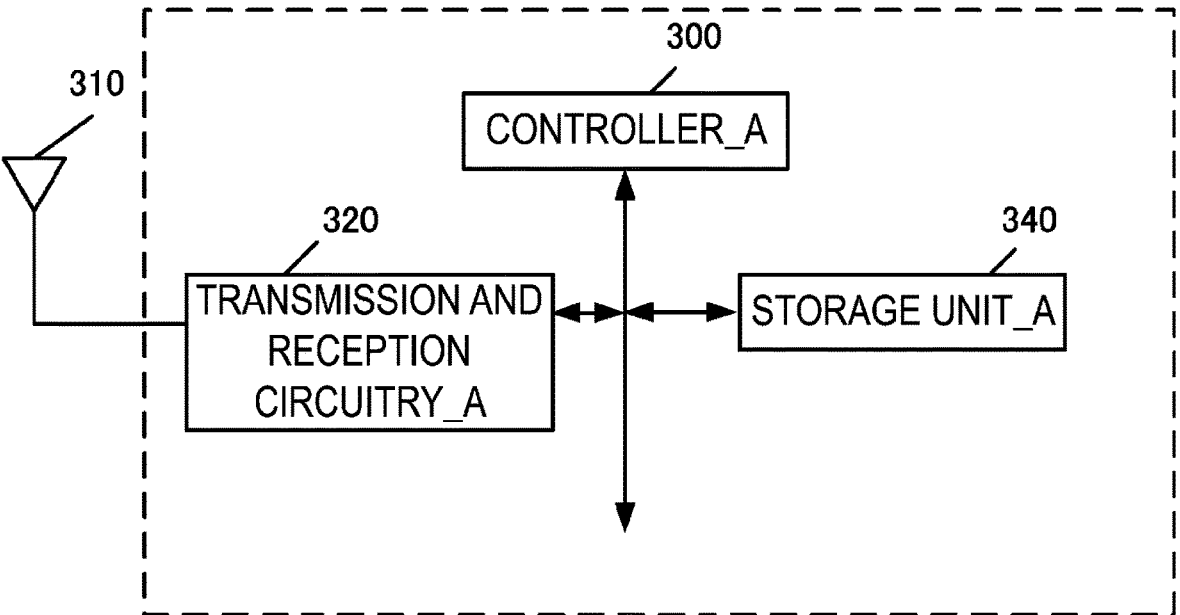
FIG. 3 is a diagram illustrating an apparatus configuration of a UE.

First, an apparatus configuration example of the User Equipment (UE) will be described with reference to FIG. 3. The UE includes a controller_A 300, an antenna 310, transmission and reception circuitry_A 320, and a storage unit_A 340. The controller_A 300, the transmission and reception circuitry_A 320, and the storage unit_A 340 are connected via a bus. The transmission and reception circuitry_A 320 connects to the antenna 310.

The controller_A 300 is a function unit that controls the entire operations and functions of the UE. The controller_A 300 reads and performs various programs stored in the storage unit_A 340 as necessary, and thereby realizes various types of processing in the UE.

The transmission and reception circuitry_A 320 is a function unit for performing radio communication with the base station apparatus (the eNB or the gNB) in the access network via the antenna. In other words, with the use of the transmission and reception circuitry_A 320, the UE can transmit and/or receive user data and/or control information to and/or from the access network apparatus, and/or the core network apparatus, and/or the PDN, and/or the DN.

The following is a detailed description with reference to FIG. 2. With the use of the transmission and reception circuitry_A 320, the UE can communicate with the base station apparatus (eNB) in the E-UTRAN over an LTE-Uu interface. The UE can communicate with the base station apparatus (gNB) in the 5G AN with the use of the transmission and reception circuitry_A 320. The UE can transmit and/or receive a Non-Access-Stratum (NAS) message to and/or from the AMF over an N1 interface with the use of the transmission and reception circuitry_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

Note that the UE may be a Mobile Station (MS).

2.2. Apparatus Configuration of gNB

Figure 4:
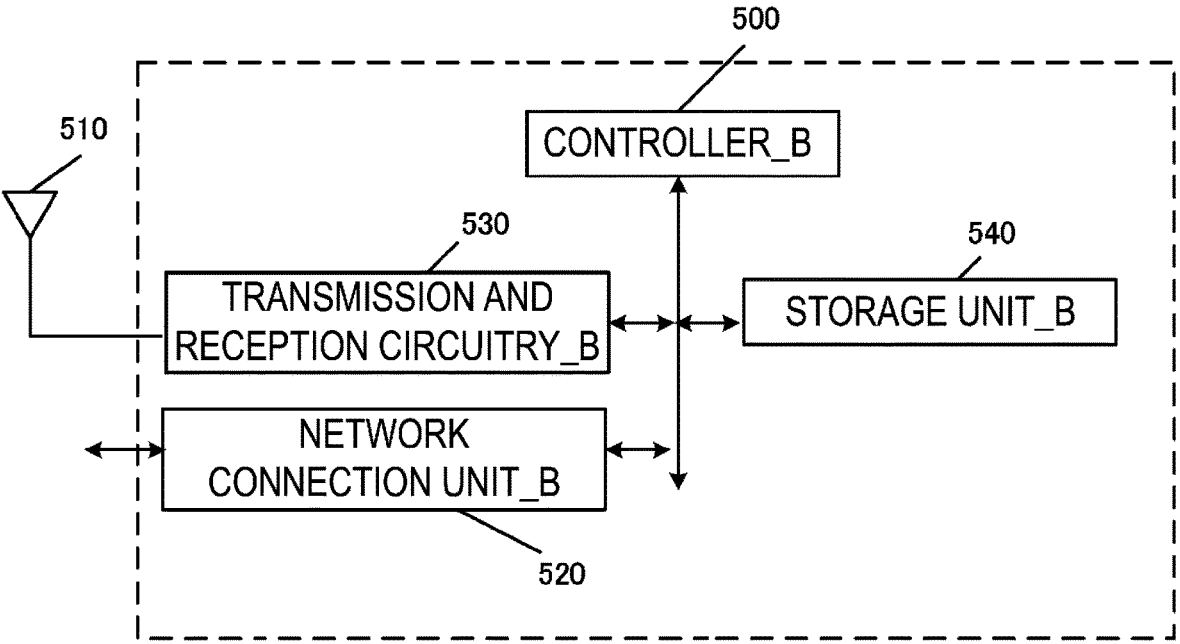
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, transmission and reception circuitry_B 530, and a storage unit_B 540. The controller_B 500, the network connection unit_B 520, the transmission and reception circuitry_B 530, and the storage unit_B 540 are connected via a bus. The transmission and reception circuitry_B 530 connects to the antenna 510.

The controller_B 500 is a function unit that controls the entire operations and functions of the gNB. The controller_B 500 reads and performs various programs stored in the storage unit_B 540 as necessary, and thereby realizes various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and reception circuitry_B 530 is a function unit for performing radio communication with the UE via the antenna 510. In other words, with the use of the transmission and reception circuitry_B 530, the gNB can transmit and/or receive user data and/or control information to and/or from the UE.

Following is a detailed description with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and reception circuitry_B 530.

The storage unit_B 540 is a function unit for storing programs, user data, control information, and the like necessary for each operation of the gNB. 2.3. Apparatus Configuration of AMF Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby realizes various types of processing in the AMF.

The network connection unit B720 is a function unit for the AMF to connect to the base station apparatus (gNB) in the 5G AN, and/or the SMF 132, and/or the PCF, and/or the UDM, and/or the SCEF. In other words, with the use of the network connection unit_B 720, the AMF can transmit and/or receive user data and/or control information to and/or from the base station apparatus (gNB) in the 5G AN, and/or the SMF 132, and/or the PCF, and/or the UDM, and/or the SCEF.

The following is a detailed description with reference to FIG. 2. With the use of the network connection unit_A 620, the AMF in the 5GCN can communicate with the gNB over the N2 interface, can communicate with the UDM over the N8 interface, can communicate with the SMF 132 over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may initiate transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Figure 5:
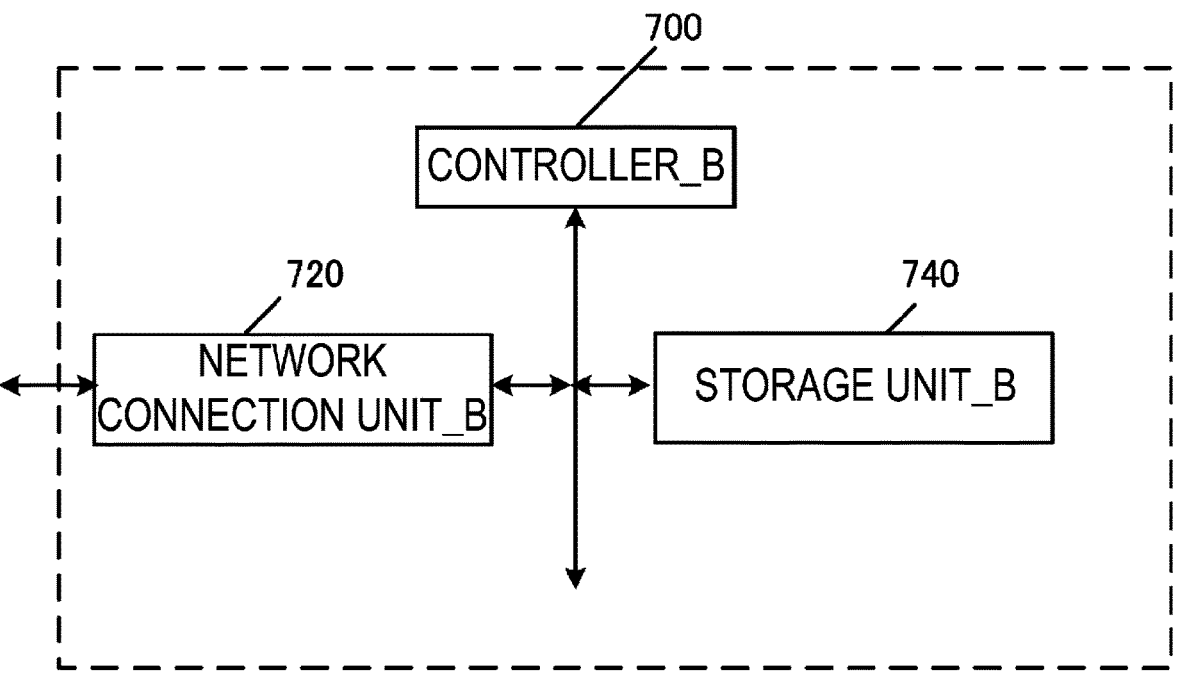
FIG. 5 is a diagram illustrating a configuration of a core network apparatus (AMF/SMF/UPF) in the 5GS.

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The control-ler_B 700 reads and performs various programs stored in the storage unit_B 740 as necessary, and thereby realizes various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Following is a detailed description with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby realizes various types of processing in the UPF.

The network connection unit_B 720 is a function unit for the UPF to connect to the base station apparatus (gNB) in the 5G AN, and/or the SMF, and/or the DN. In other words, with the use of the network connection unit_B 720, the UPF can transmit and/or receive user data and/or control information to and/or from the base station apparatus (gNB) in the 5G AN, and/or the SMF, and/or the DN.

Following is a detailed description with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Terms in the Present Embodiments

Now, other apparatuses, and/or functions, and/or terms, and/or identification information and/or messages transmitted and/or received, and stored and managed by the respective apparatuses, will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM or may be a control message transmitted and/or received between the UE_A 10 and the SMF 132 via the AMF 140. Furthermore, the SM message may include a PDU session establishment request message, a PDU session establishment accept message, a PDU session reject message (PDU session establishment reject message), a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the NW (network).

A Mobility management (MM) message (also referred to as a NAS MM message) may be a NAS message used in a procedure for MM, or may be a control message transmitted and/or received between the UE_A 10 and the AMF 140. Furthermore, the MM message may include a Registration request message, a Registration Accept message, a Registration reject message, a De-registration request message, a De-registration accept message, a configuration update command message, a configuration update complete message, a Service request message, a Service accept message, a Service reject message, a Notification message, a Notification response message, and the like.

The procedure for MM or the MM procedure may include a Registration procedure, a De-registration procedure, a Generic UE configuration update procedure, an authentication and/or authorization procedure, a Service request procedure, a Paging procedure, and a Notification procedure.

In addition, the MM procedure may include a NAS transport procedure, a NAS transport procedure initiated by the UE (UE-initiated NAS transport procedure), and a NAS transport procedure initiated by the NW (Network-initiated NAS transport procedure).

Here, the registration procedure is a procedure, initiated by the UE, for registration with the access network_B, and/or the core network_B, and/or the DN. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the present procedure in a case that a running back-off timer or another timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Further, the UE may initiate the registration procedure based on completion of the registration procedure, or completion of a generic UE configuration update procedure, or completion of a UE policy management procedure, or completion of the procedure for SM, or the like. Note that these are not restrictive, and the UE can perform the registration procedure at any timing.

Note that the above-described procedure for the UE to transition from the state (deregistered state) of not being registered with the network to the state (registered state) of being registered with the network may be an initial registration procedure or a registration procedure for initial registration. The registration procedure performed in the state (registered state) in which the UE is registered with the network may be a registration procedure for mobility and periodic registration update or a mobility and periodic registration procedure.

The generic UE configuration update procedure may be initiated in a case that the AMF updates a configuration of the UE for access and mobility management-related parameters. The generic UE configuration update procedure may also be initiated in a case that the UE is requested to perform a registration procedure for mobility and periodic registration update in order to update the access and mobility management-related parameters. Further, the UE may initiate the generic UE configuration update procedure, based on completion of the registration procedure, or completion of the generic UE configuration update procedure, or completion of the UE policy management procedure, or completion of the procedure for SM, or the like.

The generic UE configuration update procedure is initiated by the AMF transmitting a Configuration update command to the UE via the access network.

Here, the SM message is a message transmitted and/or received in an N1 SM container included in the NAS message and/or MM message transmitted and/or received on the N1 interface and N11 interface.

The MM message is a NAS message transmitted and/or received over the N1 interface. The MM message may be transmitted and/or received between the UE and the 5G AN (or the gNB) in an RRC message.

The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non-EPS service.

There are two types of access types, namely 3GPP access and non-3GPP access. Here, information indicating the access type may be configured as an access type information element (IE), and may be, for example, identification information indicating an access type used for transmission and/or reception of signalling or user data between the UE and the core network.

An access technology means a kind of radio access technology of the 3GPP access, and may include NG-RAN, E-UTRAN, UTRAN, GERAN, or the like. The access technology is also referred to as access technology. Note that the access technology may be identified by access network identification information (Access Technology Identifier). Further, the access network identification information may be information capable of identifying the access technology and an operation mode of the access technology.

A Packet Data Network (PDN) type indicates a type of PDN connection and includes IPv4, IPv6, IPv4v6, and non-IP. In a case that IPv4 is specified, it indicates that transmission and/or reception of data is performed using IPv4. In a case that IPv6 is specified, it indicates that transmission and/or reception of data is performed using IPv6. In a case that IPv4v6 is specified, it indicates that transmission and/or reception of data is performed using IPv4 or IPv6. In a case that non-IP is specified, it indicates that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may manage a PDU session in association with one or more pieces of identification information. Note that these pieces of identification information may include one or more of S-NSSAI, a DNN, a QoS rule, a 5QI, a PDU session type, application identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW A 30/UPF A 235 connecting the core network_B 190. In addition, the DNN may correspond to an Access Point Name (APN).

Note that a PDU session established using the DNN refers to a state in which the UE has received the DNN from the network and established the PDU session associated with the received DNN in the PDU session establishment procedure.

A Protocol Data Unit/Packet Data Unit (PDU) session type indicates a type of PDU session and includes IPv4, IPv6, Ethernet, and Unstructured. In a case that IPv4 is specified, it indicates that transmission and/or reception of data is performed using IPv4. In a case that IPv6 is specified, it indicates that transmission and/or reception of data is performed using IPv6. In a case that Ethernet is specified, it indicates that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator that is a (mobile) network operator, and the operator can be identified by a PLMN ID. In this specification, the PLMN may refer to a PLMN ID. A PLMN that matches a Mobile Network Code (MNC) and a Mobile Country Code (MCC) of an International Mobile Subscriber Identity (IMSI) of the UE may be a Home PLMN (HPLMN). The PLMN may refer to a core network.

Furthermore, the UE may store, in a USIM, an Equivalent HPLMN list for identifying one or multiple Equivalent HPLMNs (EHPLMNs). A PLMN different from the HPLMN and/or the EHPLMN may be a Visited PLMN (VPLMN).

The PLMN with which the UE has been successfully registered may be a Registered PLMN (RPLMN). Each apparatus may receive, from the RPLMN, and/or hold and/or store an Equivalent PLMN list for identifying one or multiple Equivalent PLMNs (EPLMNs) which can be used equivalently to the RPLMN in the UE PLMN selection.

A current PLMN may be a PLMN requested by the UE, and/or a PLMN selected by the UE, and/or an RPLMN, and/or a PLMN allowed by the network, and/or a PLMN to which a core network apparatus transmitting and/or receiving a message belongs.

The PLMN requested refers to a destination network of a message in a case that the UE transmits the message. Specifically, the PLMN requested may be a PLMN selected by the UE in a case that the UE transmits the message. The PLMN requested may refer to a PLMN requested by the UE and may be a current PLMN. For the UE in a registered state, the PLMN requested may be a registered PLMN.

A Stand-alone Non-Public Network (SNPN) is a network which is identified by an SNPN ID configured by combining a PLMN ID and a Network Identifier (NID), and to which only a specific UE is allowed to connect. The SNPN may refer to a core network. Here, the UE allowed to access the SNPN may be an SNPN enabled UE.

Furthermore, the UE may store, in the USIM, an Equivalent SNPN list for identifying one or multiple Equivalent SNPNs (ESNPNs). An SNPN different from an HSNPN and/or the ESNPN may be a VPLMN (Visited PLMN).

The SNPN with which the UE has been successfully registered may be a Registered SNPN (RSNPN). Each apparatus may receive, from the RSNPN, and/or hold and/or store an Equivalent SNPN list for identifying one or multiple Equivalent PLMNs (ESNPNs) which can be used equivalently to the RSNPN in the UE PLMN selection or SNPN selection.

The 5G QoS Identifier (5QI) may be a scalar that uses QoS characteristics (5G QoS characteristics) as a reference. Here, the QoS characteristic is an access node specific parameter, and may be information indicating a specific QoS forwarding behavior such as a packet loss rate, a packet delay budget, and the like.

Note that a PDU session established using the 5QI refers to a state in which the UE receives the 5QI from the network and establishes the PDU session associated with the received 5QI in the PDU session establishment procedure.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be mapped. Here, the NF is a processing function in a network, and is adopted or defined in 3GPP. The NSI is an entity of one or more NSs configured in the core network_B. The NSI may include a virtual Network Function (NF) generated using a Network Slice Template (NST).

Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS.

The UE and/or the apparatus in the network can be allocated to one or more NSs, based on NSSAI, and/or S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF 132 and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more pieces of S-NSSAI in the registration information of the UE as default S-NSSAI. Note that, in a case that the S-NSSAI is the default S-NSSAI, and the UE does not transmit to a network valid S-NSSAI in a registration request message, the network may provide an NS related to the UE.

The S-NSSAI transmitted and/or received between the UE and the NW may be referred to as an S-NSSAI Information element (IE). Further, the S-NSSAI IE transmitted and/or received between the UE and the NW may include S-NSSAI including an SST and/or SD of a registered PLMN, and/or an SST and/or SD indicating S-NSSAI of an HPLMN to which the S-NSSAI is mapped. One or multiple pieces of S-NSSAI stored in the UE and/or the NW may include an SST and/or an SD, or may include S-NSSAI including an SST and/or an SD, and/or an SST and/or SD indicating S-NSSAI of the HPLMN to which the S-NSSAI is mapped.

Note that a PDU session established using S-NSSAI refers to a state in which the UE receives the S-NSSAI from the network and establishes the PDU session associated with the received S-NSSAI in the PDU session establishment procedure.

The Network Slice Selection Assistance Information (NS-SAI) is a set of pieces of S-NSSAI. Each piece of S-NSSAI included in the NSSAI is information for assisting the access network or the core network to select the NSI. The UE may store the NSSAI allowed by the network for each PLMN. The NSSAI may be information used for selecting the AMF. The UE may apply each piece of NSSAI (allowed NSSAI, and/or configured NSSAI, and/or rejected NSSAI, and/or pending NSSAI, and/or first NSSAI) to the PLMN and the EPLMN.

The mapped S-NSSAI is the S-NSSAI of the HPLMN mapped to the S-NSSAI of the registered PLMN in a roaming scenario. The UE may store one or multiple pieces of mapped S-NSSAI mapped to the S-NSSAI included in the configured NSSAI and the allowed NSSAI of each access type. Furthermore, the UE may store one or multiple pieces of mapped S-NSSAI of the S-NSSAI included in the first NSSAI and/or the rejected NSSAI and/or the pending NSSAI.

Also, configured NSSAI is NSSAI fed and stored in the UE. The UE may store the configured NSSAI for each PLMN. The UE may store the configured NSSAI in association with the PLMN. Note that in this specification, the configured NSSAI associated with the PLMN may be expressed as the configured NSSAI with respect to the PLMN, or the configured NSSAI of the PLMN, or the configured NSSAI for the PLMN, or the configured NSSAI associated with the PLMN. The UE may store configured NSSAI that is not associated with a PLMN and is valid for all PLMNs, and such configured NSSAI may be referred to as "default configured NSSAI".

The configured NSSAI may be associated with multiple PLMNs, and these multiple PLMNs may be EPLMNs.

The configured NSSAI may be information configured by the network (or PLMN). The S-NSSAI included in the configured NSSAI may be referred to as configured S-NS-SAI. The configured S-NSSAI may include S-NSSAI and mapped S-NSSAI. Alternatively, the S-NSSAI of the PLMN may be referred to as the "configured S-NSSAI", and S-NSSAI with the configured S-NSSAI being mapped to the HPLMN may be referred to as "mapped S-NSSAI for the configured NSSAI for a PLMN".

The configured NSSAI may be updated by the NW at any timing, and the updated configured NSSAI may be transmitted from the NW to the UE based on the update.

Requested NSSAI is NSSAI provided to the network from the UE during the registration procedure. In the registration procedure, the S-NSSAI included in the requested NSSAI transmitted by the UE may be S-NSSAI included in the allowed NSSAI or configured NSSAI stored in the UE. In the PDU session establishment procedure, the S-NSSAI included in the requested NSSAI transmitted by the UE may be S-NSSAI included in the allowed NSSAI stored in the UE.

The requested NSSAI may be information indicating a network slice requested by the UE. The S-NSSAI included in the requested NSSAI may be referred to as requested S-NSSAI. For example, the requested NSSAI is included, and transmitted and/or received in a Non-Access-Stratum (NAS) message transmitted from the UE to the network, such as a registration request message or a PDU session establishment request message, or in a Radio Resource Control (RRC) message including the NAS message. Here, in a roaming case, the requested NSSAI may include the S-NSSAI of the VPLMN and the S-NSSAI of the mapped HPLMN. In other words, the S-NSSAI included in the requested NSSAI (requested S-NSSAI) may include the S-NSSAI and the mapped S-NSSAI.

The allowed NSSAI is information indicating one or multiple network slices allowed for the UE. In other words, the allowed NSSAI is information for identifying a network slice to which the UE is allowed by the network to connect. The allowed NSSAI may be allowed NSSAI stored in the UE and/or the NW, or allowed NSSAI transmitted from the NW to the UE.

The UE and/or the NW may store and manage the allowed NSSAI for each access (3GPP access or non-3GPP access) as UE information. The UE and/or the NW may further manage the allowed NSSAI in association with a registration area.

Further, the UE and/or the NW may store and manage the allowed NSSAI in association with the PLMN as the UE information. The allowed NSSAI may be associated with multiple PLMNs, and these multiple PLMNs may be EPLMNs.

Note that in this specification, the allowed NSSAI associated with the PLMN and the access type may be expressed as allowed NSSAI for the PLMN and the access type or allowed NSSAI for the access type of the PLMN. The S-NSSAI included in the allowed NSSAI may be referred to as allowed S-NSSAI. The allowed S-NSSAI may include S-NSSAI and mapped S-NSSAI.

The rejected NSSAI is information indicating one or multiple network slices the UE is not allowed to use or request. In other words, the rejected NSSAI is information for identifying a network slice to which the UE is not allowed by the network to connect. The rejected NSSAI transmitted from the NW to the UE may be included in a rejected NSSAI IE or an Extended rejected NSSAI IE. The rejected NSSAI transmitted and/or received using the rejected NSSAI IE may be information including one or multiple combinations of S-NSSAI and a reject cause value. The rejected NSSAI transmitted and/or received using the Extended rejected NSSAI IE in roaming may be information including one or multiple combinations of S-NSSAI, mapped S-NSSAI and a reject cause value.

Here, the S-NSSAI included in the rejected NSSAI may be associated with a PLMN ID or an SNPN ID. Noted that the PLMN or the SNPN indicated by the PLMN ID or the SNPN ID with which the S-NSSAI included in the rejected NSSAI is associated may be the current PLMN or the current SNPN. Alternatively, the PLMN ID or the SNPN ID with which the S-NSSAI included in the rejected NSSAI is associated may be information indicating the HPLMN or the HSNPN regardless of the current PLMN or SNPN.

Here, the reject cause value is information indicating why the network rejects the corresponding S-NSSAI. The UE and/or the network may appropriately store and manage the rejected NSSAI, based on the reject cause value associated with each piece of S-NSSAI.

Furthermore, the rejected NSSAI may be included in the NAS message transmitted from the network to the UE, such as the registration accept message, the configuration update command, the registration reject message, or in the RRC message including the NAS message. The S-NSSAI included in the rejected NSSAI may be referred to as rejected S-NSSAI.

The UE and/or the NW may store and manage the rejected NSSAI in association with the PLMN as the UE information. The rejected NSSAI may be associated with multiple PLMNs, and these multiple PLMNs may be EPLMNs.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The Registration area is a set of one or multiple TAs allocated to the UE by the AMF. Note that while moving within one or multiple TAs included in the registration area, the UE_A 10 may be able to move without transmitting and/or receiving a signal for updating the tracking area. In other words, the registration area may be an information group indicating an area in which the UE_A 10 can move without performing the tracking area update procedure. The registration area may be identified by a TAI list including one or multiple TAIs.

The TAIs included in the TAI list may belong to one PLMN or may belong to multiple PLMNs. In a case that the multiple TAIs included in the TAI list belong to different PLMNs, the PLMNs may be EPLMNs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

SOR stands for Steering of Roaming, and refers to a scheme and a technology that allow the UE to be prompted to roam to a prioritized roaming network (or recommended roaming network) indicated by the HPLMN.

The steering of roaming connected mode control information (SOR-CMCI) refers to HPLMN information for controlling a timing at which the UE transitions from the 5GMM connected mode to the 5GMM non-connected mode in order to perform the SOR. The SOR-CMCI may be included in SOR information and/or an SOR transport container (SOR transparent container) or may be included, and transmitted and/or received in another information element.

The SOR-CMCI may include criteria information and a first timer value. Furthermore, the criteria information and the first timer value may be associated with each other.

Here, the criteria information may include a criterion belonging to a PDU session, and/or a criterion for a service type, and/or a criterion belonging to all types.

Further, the criterion belonging to the PDU session may be criteria information for identifying a corresponding PDU session. Specifically, the criterion belonging to the PDU session may be criteria information including one or more of S-NSSAI_A, DNN_A, 5QI_A, access type, PDU session type, and PDU session ID_A.

In addition, the criterion for the service type may be criteria information for identifying a corresponding service. Specifically, the criterion for the service type may be criteria information including one or more of IMS registration related signalling, MINITEL voice call, MMTEL video call, MO SMS over NAS or MO SMSoIP.

Furthermore, the criterion belonging to all types may be criteria information matching in any state.

Moreover, the SOR-CMCI may include multiple pieces of criteria information. In a case that multiple pieces of criteria information are included in the SOR-CMCI, the SOR-CMCI may include multiple first timer values. In this case, the respective pieces of criteria information and the respective first timer values may be associated with each other on a one-to-one basis.

In other words, in a case that multiple PDU sessions are established, the SOR-CMCI may include multiple pieces of criteria information and multiple first timer values. Furthermore, also in a case that multiple services are running, multiple pieces of criteria information and multiple first timer values may be included.

Further, each piece of criteria information may include a priority. In other words, each piece of criteria information may also include information indicating the priority of the criteria information.

Conversely, the SOR-CMCI may include only one piece of criteria information. In a case that only one piece of criteria information is included in the SOR-CMCI, the SOR-CMCI may include one first timer value. In this case also, the criteria information and the first timer value may be associated with each other on a one-to-one basis. Further, in this case, the SOR information and/or the SOR transport container (SOR transparent container) may include one or multiple pieces of SOR-CMCI.

In other words, in the case that multiple PDU sessions are established, the SOR information and/or the SOR transport container may include multiple pieces of SOR-CMCI. Furthermore, also in the case that multiple services are running, the SOR information and/or the SOR transport container may include multiple pieces of SOR-CMCI.

Further, each piece of SOR-CMCI may also include a priority. In other words, each piece of SOR-CMCI may also include information indicating the priority of the SOR-CMCI.

The SOR-CMCI may be determined based on an operator policy and may be information transmitted from the UDM to the UE.

The Steering of roaming information (SOR information) may be information of SOR including information protected by the HPLMN. The Steering of roaming information may include information indicating whether to request an acknowledgement (Ack) from the UE, the Ack being a response indicating that the Steering of roaming information has been successfully received.

The SOR information may include a list of recommended (or prioritized) PLMN and access technology combinations and information indicating that the list is included, or a secured packet and information indicating that the packet is included, or information indicating that the list of recommended PLMN and access technology combinations stored in the UE does not need to be changed and thus the information indicating the list of recommended PLMN and access technology combinations is not included in the Steering of roaming information.

The SOR information and the Ack which is a response indicating that the UE has successfully received the SOR information may be included, and transmitted and/or received in an SOR transport container information element (SOR transparent container information element) included in the NAS message.

N1 NAS signalling connection is a connection between the UE and the network (AMF), and may be managed and present independently over 3GPP access and over non-3GPP access.

A state in which the N1 NAS signalling connection is established may be the 5GMM-CONNECTED mode. A state in which the N1 NAS signalling connection is not established may be the 5GMM-IDLE mode.

In other words, the state in which the N1 NAS signalling connection is established over 3GPP access may be expressed as that the UE is in the 5GMM connected mode in 3GPP access (5GMM-CONNECTED mode over 3GPP access), and the state in which the N1 NAS signalling connection is not established over 3GPP access may be expressed as that the UE is in the 5GMM non-connected mode in 3GPP access (5GMM-IDLE mode over 3GPP access).

Similarly, a state in which the N1 NAS signalling connection is established over non-3GPP access may be expressed as that the UE is in the 5GMM connected mode in non-3GPP access (5GMM-CONNECTED mode over non-3GPP access), and a state in which the N1 NAS signalling connection is not established over non-3GPP access may be expressed as that the UE is in the 5GMM non-connected mode in non-3GPP access (5GMM-IDLE mode over non-3GPP access).

The service type may be a kind of service that the UE can perform and/or the UE is performing. Specifically, the service indicated by the service type may be IMS registration related signalling, and/or MINITEL voice call, and/or MMTEL video call, and/or MO SMS over NAS(SMSo-NAS), and/or MO SMSoIP.

Note that IMS may stand for IP Multimedia Subsystem. MINITEL may stand for multimedia telephony service. SMS may stand for Short Message Service. NAS may stand for Non-Access-Stratum. MO may stand for Mobile Origi-nated. SMSoIP may stand for SMS over IP (networks).

The service type may be a type of access attempt and/or an access category, or may indicate a service indicated by such information.

The type of access attempt is a type classified according to a trigger for initiating access in a case that the UE attempts access (initiates access attempt), and may be used to determine the access category.

The access category is a category that the UE determines based on the type of access attempt. In a case that the UE stores operator-defined access category definitions, the UE may use the operator-defined access category definitions to determine the access category.

The mode of the UE in the PLMN selection includes an automatic network selection mode and a manual network selection mode. Note that in this specification, the automatic network selection mode is also referred to as an automatic mode, and the manual network selection mode is also referred to as a manual mode.

The automatic mode in the PLMN selection is a mode in which the PLMN selection is performed automatically. The UE in the automatic mode selects a PLMN and access technology combination stored in the UE, based on the priority. Specifically, in the automatic mode, in the PLMN selection by the UE (or the MS), a PLMN and access technology combination with the highest priority available to the UE is selected.

The manual mode in the PLMN selection is a mode in which a user (user of the UE or the MS) manually performs the PLMN selection. In the manual mode, the UE (or MS) indicates one or multiple selectable PLMNs to the user and performs roaming to a VPLMN only in a case that the user selects any.

The Steering of roaming connected mode control information (SOR-CMCI) refers to information that allows the network such as an HPLMN to control a timing at which the UE in the connected mode transitions to the non-connected mode for the SOR. The SOR-CMCI may be information based on the operator policy and/or the HPLMM policy. The SOR-CMCI may be information configured for each apparatus or may be information notified from the NW to the UE.

Each apparatus may manage and/or store multiple pieces of SOR-CMCI for the UE, or may manage and/or store one piece of SOR-CMCI.

The SOR-CMCI may be configured to include a criterion belonging to one or more PDU sessions, and/or one or more service type criteria, and/or a criterion (condition) indicating a case of matching all criteria.

The criterion belonging to one PDU session included in one piece of SOR-CMCI may include one piece of S-NSSAI and/or one DNN and/or one 5QI. The criterion belonging to one PDU session included in one piece of SOR-CMCI may further include information indicating one access technology, and/or information indicating one PDU session type, and/or a value of one PDU session ID. A case that the criterion belonging to one PDU session includes pieces of information belonging to multiple PDU sessions may mean a combination of the pieces of information.

In a case that multiple PDU sessions are established, one piece of SOR-CMCI may include criteria belonging to the multiple PDU sessions. In this case, each criterion belonging to the respective one of the PDU sessions may include one piece of S-NSSAI, and/or one DNN, and/or one 5QI, and/or information indicating an access technology, and/or information indicating a PDU session type, and/or a value of a PDU session ID.

To be specific, in the case that multiple PDU sessions are established, the SOR-CMCI may include each piece of S-NSSAI and/or each DNN and/or each 5QI used by the respective one of the PDU sessions, the SOR-CMCI may include each access type with which the respective one of the PDU sessions is established, the SOR-CMCI may include a PDU session type of each of the PDU sessions, or the SOR-CMCI may include a value of a PDU session ID identifying each of the PDU sessions.

The criterion belonging to one PDU session included in one piece of SOR-CMCI may include one or more pieces of S-NSSAI, and/or one or more DNNs, and/or one or more 5QIs. The criterion belonging to one PDU session included in one piece of SOR-CMCI may further include information indicating one or more access technologies, and/or information indicating one or more PDU session types, and/or values of one or more PDU session IDs.

One service type criterion included in one piece of SOR-CMCI may include information for identifying one or more service types, and may include information indicating MMTEL voice call, and/or information indicating MMTEL video call, and/or information indicating MO SMS over NAS, and/or information indicating MO SMSoIP.

In the case that multiple services are running, one piece of SOR-CMCI may include multiple service type criteria. In this case, each service type criterion may include information indicating MMTEL voice call, and/or information indicating MMTEL video call, and/or information indicating MO SMS over NAS, and/or information indicating MO SMSoIP.

Specifically, in the case that multiple services are running, the SOR-CMCI may include information for identifying each service.

Hereinafter, each criterion may refer to a criterion belonging to a PDU session and/or a service type criterion and/or a criterion (condition) indicating a case of matching all criteria, or may refer to each piece of information (S-NSSAI, DNN, 5QI, etc.) belonging to a PDU session included in a criterion belonging to the PDU session and/or information for identifying a service type included in a service type criterion and/or information indicating a case of matching all criteria.

The SOR-CMCI may include a timer value mapped and associated with each criterion. In a case that the SOR-CMCI includes a timer value mapped to a criterion indicating the case of matching all criteria, the timer value may be configured to be shorter than timer values mapped to other criteria.

The SOR-CMCI may include a value indicating a priority associated with each criterion. The value indicating the priority may be referred to as a precedence value, and the priorities of one or more criteria may be determined based on the precedence value. Alternatively, the priority may be indicated in accordance with the order of criteria included in the SOR-CMCI. Specifically, the criteria may be sorted and managed in order of priority from highest to lowest.

A first timer is a timer for determining a timing at which the UE in the connected mode transitions to the non-connected mode for the SOR. The first timer may be Tsor-cm in the 3GPP. The first timer may be managed by the UE and/or the NW. The first timer may be managed for each PDU session, may be managed for each access type, may be managed for each combination of a PDU session and an access type, may be managed for each service type, may be managed for each PLMN, or may be managed for each UE. Hereinafter, a timer value to which the first timer is to be set may be referred to as a first timer value.

In other words, one or more first timers may be managed for one UE, or one first timer may be managed for one UE. The first timer managed by the UE may be stored in association with the PDU session ID, and/or the information indicating the access type, and/or the information indicating the combination of the PDU session and the access type, and/or the service type, and/or the PLMN ID.

Based on the SOR-CMCI used to select the timer value to which the first timer is to be set, the criterion associated with the selected timer value, and/or information belonging to the PDU session included in the criterion, and/or information indicating the service type included in the criterion, and/or information indicating the priority associated with the criterion may be managed in association with the first timer and/or the first timer value.

The PDU session identified by the information associated with the first timer or the PDU session using the information associated with the first timer may be referred to as the PDU session associated with the first timer, and the service identified by the information associated with the first timer may be referred to as the service associated with the first timer.

Here, note that "the first timer is managed" means that the first timer is started and/or stopped and/or expired and/or run. In other words, "the UE and/or the NW manages the first timer" means that the UE and/or the NW starts and/or stops and/or expires and/or runs the first timer. A state in which the UE and/or the NW is managing the first timer means that the UE and/or the NW is running the first timer.

Here, the setting of the timer to the timer value in this specification may be performed after the selection of the timer value or may be performed in a case that the timer is to be started. In other words, for example, after the SOR-CMCI including the timer value is received and the timer value is selected based on the SOR-CMCI, the timer may be set to the timer value immediately, and the timer may be started based on the set timer value for running of the timer. For example, after the SOR-CMCI including the timer value is received and the timer value is selected based on the SOR-CMCI, and at a timing at which the timer is run, the timer may be set to the timer value and started. Hereinafter, in this specification, only one of these examples may be indicated, but the setting of the timer to the timer value may be performed at any of these timings, and is not limited thereto.

Specifically, for example, in a state in which the UE and/or the NW establish multiple PDU sessions, the first timer may be managed for each PDU session, or only one first timer may be managed.

Furthermore, for example, in a case that the UE and/or the NW establish a first PDU session and a second PDU session over 3GPP access, and establish a third PDU session and a fourth PDU session over non-3GPP access, the UE and/or the NW may manage the first timer associated with the 3GPP access and the first timer associated with the non-3GPP access, or may simultaneously manage multiple the first timers associated with the first to fourth PDU sessions.

Further, for example, in a case that the UE and/or the NW establish an MA PDU session for establishing the user plane resource over both 3GPP access and non-3GPP access, the UE and/or the NW may manage the first timer associated with the MA PDU session, or may simultaneously manage the first timer associated with the 3GPP access and the first timer associated with the non-3GPP access.

2.7. Description of Identification Information in the Present Embodiments

A first identification information may be SOR-CMCI. The SOR-CMCI may include at least one or more pieces of identification information among second to fifth identification information. In other words, the first identification information may include one or more pieces of second identification information, and/or one or more pieces of third identification information, and/or one or more pieces of fourth identification information, and/or one or more pieces of fifth identification information.

The second identification information is information indicating a criterion (or criteria) included in the SOR-CMCI. The second identification information may be referred to as a criterion, criterion information, criteria, criteria information, or the like.

The second identification information may be information indicating a value of S-NSSAI and/or a value of a DNN and/or a 5QI and/or a service type, and/or information indicating matching all types of criteria. A value indicating a combination of S-NSSAI and a DNN may include the value of the DNN and the value of the S-NSSAI.

Further, the second identification information may include information indicating an access technology, and/or information indicating a PDU session type, and/or a value of a PDU session ID.

The second identification information may be or include values of one or more pieces of S-NSSAI, and/or values of one or more DNNs, and/or one or more 5QIs, and/or information indicating one or more service types. The second identification information may be or include information indicating one or more access technologies, and/or information indicating one or more PDU session types, and/or values of one or more PDU session IDs. In a case that the second identification information includes the value of the S-NSSAI, the S-NSSAI may be the mapped S-NSSAI in a case of the UE being roaming, or may be the S-NSSAI of the current PLMN in a case of the UE being not in roaming. Alternatively, in the case that the second identification information includes the value of the S-NSSAI, the S-NS-SAI may be the S-NSSAI of the current PLMN. Alternatively, in the case that the second identification information includes the value of the S-NSSAI, the S-NSSAI may include the value of the S-NSSAI of the current PLMN and the value of the mapped S-NSSAI in a case of the UE being in roaming, and may be the S-NSSAI of the current PLMN in a case of the UE being not in roaming.

Here, the service type indicated by the information indicating the service type may include IMS registration related signalling, and/or MINITEL voice call, and/or MMTEL video call, and/or MO SMS over NAS, and/or MO SMSoIP, or may be information indicating other services.

For example, in a case that the second identification information is the information indicating the service type, the second identification information may indicate a Mobile Originated-Location Request (5GC-MO-LR) procedure, and/or a UE-triggered V2X policy provisioning procedure, and/or a CIoT user data transfer over the control plane.

The second identification information may be a value of a type indicated in the fourth identification information. Specifically, in a case that the fourth identification information is information indicating a DNN, the second identification information may be a value of the DNN. In a case that the fourth identification information is information indicating S-NSSAI, the second identification information may be a value of the S-NSSAI. In a case that the fourth identification information is information indicating a 5QI, the second identification information may be a value of the 5QI.

In a case that the fourth identification information indicates information indicating an access technology, the second identification information may be information indicating the access technology. In a case that the fourth identification information indicates information indicating a PDU session type, the second identification information may be information indicating the PDU session type. In a case that the fourth identification information is information indicating a PDU session ID, the second identification information may be a value of the PDU session ID.

For example, in a case that the second identification information is information indicating matching all types of criteria, each apparatus may apply the timer value indicated in the third identification information associated with the second identification information regardless of information associated with the established PDU session (for example, a value of S-NSSAI, a value of a DNN, or a value of a 5QI) or the kind of the service being running.

The UE may be notified of each piece of information described as the second identification information as independent information from the NW. To be more specific, the value of the S-NSSAI, the UE may be notified of the value of the DNN, the value of the 5QI, or a value indicating a combination of S-NSSAI and DNN, which is a criterion value indicating an attribute of a PDU session, the information indicating the service, and the information indicating matching all types of criteria as different pieces of information.

The third identification information is a timer value indicating a timing to start the SOR, and may be associated with the second identification information. The third identification information may be a timer value to which the first timer is to be set. A value included in the third identification information may be a value equal to or greater than 0. Infinity may be indicated in the third identification information.

The timer value included in the third identification information may be a value associated with the criterion included in the second identification information.

In a case that a PDU session matching the criterion indicated in the second identification information is being established or a service is running, the timer value indicated in the third identification information may be selected and/or applied.

The third identification information may include multiple timer values. The third identification information may include an individual timer value associated with each of information indicating one or more DNNs and/or one or more pieces of S-NSSAI and/or one or more 5QIs and/or one or more access technologies, and/or information indicating one or more PDU session types, and/or values of one or more PDU session IDs, and/or information indicating one or more service types included in the second identification information.

Furthermore, the third identification information may be the first timer value.

The fourth identification information is information indicating a kind of information indicated in the second identification information, and may be associated with the second identification information. For example, in a case that the second identification information is a value of S-NSSAI, the fourth identification information may be information indicating the S-NSSAI. For example, in a case that the second identification information is a value of a DNN, the fourth identification information may be information indicating the DNN. For example, in a case that the second identification information is a value of a 5QI, the fourth identification information may be information indicating the 5QI.

In a case that the second identification information is information indicating an access technology, the fourth identification information may indicate information indicating the access technology. In a case that the second identification information is information indicating a PDU session type, the fourth identification information may indicate information indicating the PDU session type. In a case that the second identification information is a value of a PDU session ID, the fourth identification information may be information indicating the PDU session ID.

The fourth identification information may be transmitted and/or received in a case that the second identification information is a criterion belonging to a PDU session. In other words, the fourth identification information may be transmitted and/or received in a case other than a case where the second identification information is a criterion indicating a service type and/or information indicating matching all types of criteria.

In the case that the second identification information is information indicating a service type, the fourth identification information may be information indicating that the second identification information is information indicating the service type. Alternatively, in the case that the second identification information is information indicating a service type, the fourth identification information need not be transmitted and/or received.

In the case that the second identification information is information indicating matching all types of criteria, the fourth identification information may be information indicating that the second identification information matches all types of criteria. Alternatively, in the case that the second identification information is information indicating matching all types of criteria, the fourth identification information need not be transmitted and/or received.

Furthermore, the fourth identification information may be information indicating a type of the second identification information.

The fifth identification information is information indicating a priority of the second identification information. The information indicating the priority may be represented by a precedence value. For example, a lower numerical value of the precedence value may mean a higher priority. The NW may allow the same priority to not belong to multiple criteria, or may allow the same priority to belong to multiple criteria.

3. EMBODIMENTS IN PRESENT INVENTION

The embodiments in the present invention include an example of a behavior in which the NW configures a timing at which the UE transitions from the connected mode to the idle mode and a behavior in which the UE transitions from the connected mode to the idle mode based on the configuration.

A specific example of the embodiments of the present invention will be described below.

3.1. First Embodiment

Figure 6:
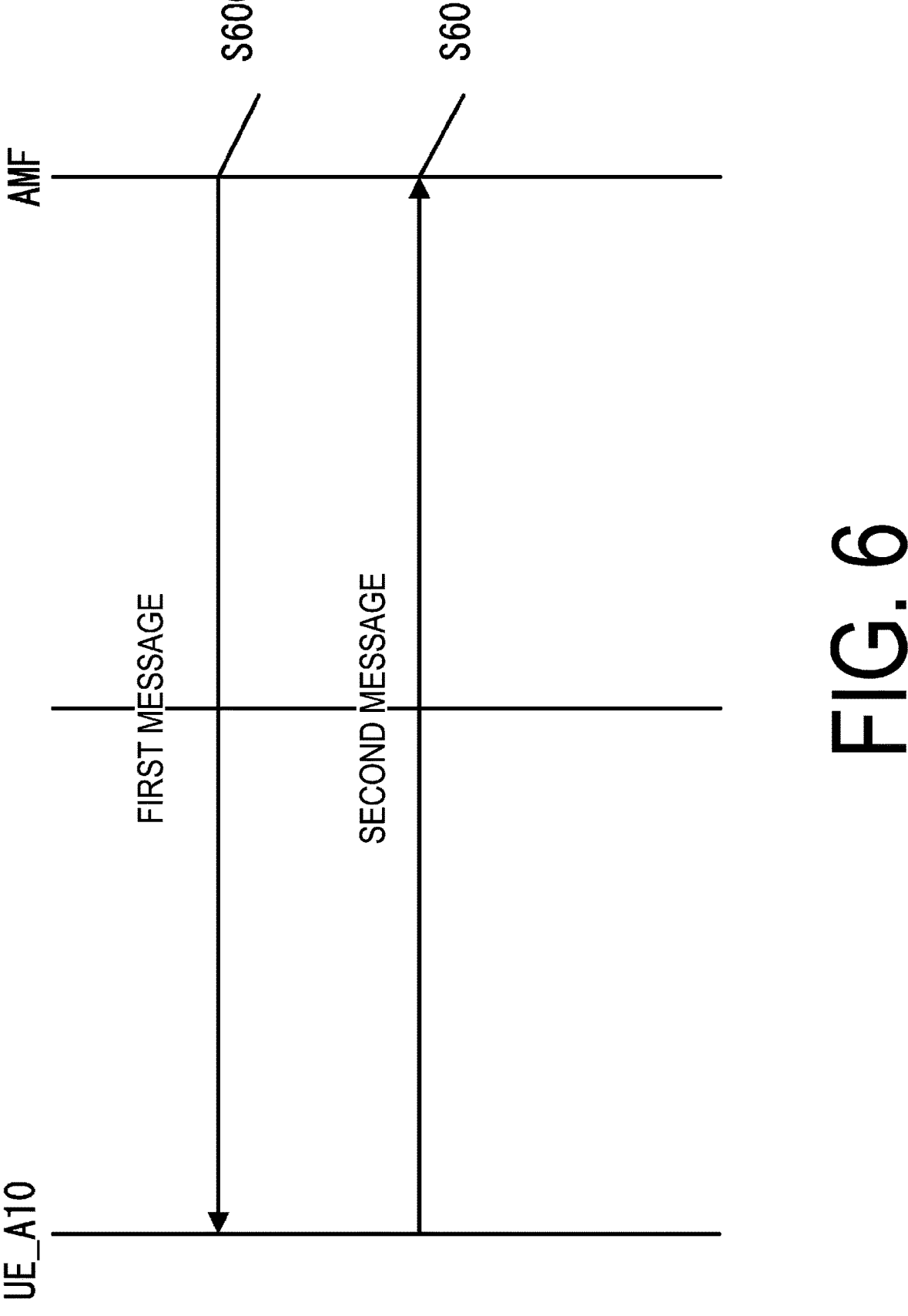
FIG. 6 is a diagram illustrating a procedure for notifying SOR-CMCI.

Hereinafter, an embodiment in which the NW notifies the UE_A 10 of the SOR-CMCI in order for the NW to configure a timing at which the UE_A 10 transitions from the connected mode to the idle mode will be described with reference to FIG. 6.

A procedure in which the NW notifies the UE_A 10 of the information indicating the timing at which the UE_A 10 transitions from the connected mode to the idle mode may be the MM procedure, and is hereinafter referred to as the present procedure. Note that the present procedure may be included in the MM procedure.

For example, in a case that the present procedure is included in the registration procedure, a first message (S600) may be a registration accept message and a second message (S602) may be a registration complete message. The registration procedure may be the initial registration procedure, or may be the mobility and periodic registration procedure.

For example, in a case that the present procedure is included in the Generic UE configuration update procedure, the first message (S600) may be a configuration update command message (CONFIGURATION UPDATE COMMAND message) and the second message (S602) may be a configuration update complete message (CONFIGURATION UPDATE COMPLETE message).

In other words, in a case that the present procedure is implemented by the Generic UE configuration update procedure, the first message (S600) may be the configuration update command message (CONFIGURATION UPDATE COMMAND message) and the second message (S602) may be the configuration update complete message (CONFIGURATION UPDATE COMPLETE message).

For example, in a case that the present procedure is implemented by the NAS transport procedure, the first message (S600) may be a downlink NAS transport message (DL NAS TRANSPORT message) in the NAS transport procedure initiated by the NW (Network-initiated NAS transport procedure) and the second message (S602) may be an uplink NAS transport message (UL NAS TRANSPORT message) in the NAS transport procedure initiated by the UE_A 10 (UE-initiated NAS transport procedure).

Regardless of the above description, the first message and/or the second message may be a NAS MM message.

Further, the first message and/or the second message may be a NAS message.

The AMF 140 transmits the first message to the UE_A 10 (S600). The AMF 140 can transmit, in the first message, at least one piece of one or more identification information among the first to fifth identification information. In a case that multiple pieces of identification information are transmitted and/or received, two or more pieces of identification information among these pieces of identification information may be configured as one or more pieces of identification information. Note that information indicating support of each function and information indicating a request for use of each function may be transmitted and/or received as the same piece of identification information, or may be transmitted and/or received as different pieces of identification information.

The AMF 140 may determine transmission of the first message and information to be included in the first message, based on the information received from the UE_A 10.

To be more specific, in a case that the UE_A 10 transmits a control message (for example, a registration request message) including capability information (Capability) indicating that the UE_A 10 supports the SOR-CMCI function to the AMF 140, the AMF 140 may transmit, in the first message, one or more pieces of identification information among the first to fifth identification information to the UE_A 10, based on the reception of the capability information indicating that the UE_A 10 supports the SOR-CMCI function from the UE_A 10 and/or based on the UE_A 10 supporting the SOR-CMCI function. Note that the first identification information may include one or more pieces of identification information of at least one among the second to fifth identification information. In other words, the first message may include the first identification information and/or one or more pieces of second identification information and/or one or more pieces of third identification information and/or one or more pieces of fourth identification information and/or one or more pieces of fifth identification information.

The AMF 140 may also include other identification information in the first message. For example, the AMF 140 may include the SOR transport container information element (SOR transparent container IE) in the first message. One or more pieces of identification information of at least one among the first to fifth identification information may be included in the SOR transport container information element and transmitted.

The SOR transport container information element included in the first message may include the SOR information, may include a list of recommended (or prioritized) PLMN and access technology combinations and the list, or may include a secured packet. In this case, the SOR transport container information element may further include information indicating that the SOR information is included in the SOR transport container information element.

The SOR transport container information element included in the first message may include information indicating whether to request an acknowledgement (ACK). In other words, the SOR transport container information element may include information indicating that an ACK is requested or information indicating that an ACK is not requested.

In a case that one or more pieces of identification information of at least one among the first to fifth identification information are included in the SOR transport container information element, information indicating that the SOR-CMCI is included may be included in the SOR transport container information element.

Next, the UE_A 10 receives the first message (S600). To be more specific, the UE_A 10 receives the first message transmitted by the AMF 140.

The UE_A 10, in a case of receiving the first identification information, may update the stored SOR-CMCI to the received new SOR-CMCI. In other words, the UE_A 10 storing the SOR-CMCI may delete the information included in the old SOR-CMCI or the old SOR-CMCI and store the new SOR-CMCI, based on the reception of the first identification information.

Further, the UE_A 10, in a case of receiving the first identification information including the new SOR-CMCI, may update the stored old SOR-CMCI to the received new SOR-CMCI. In other words, the UE_A 10, in the case of receiving the first identification information including the new SOR-CMCI, may delete the old SOR-CMCI and store the new SOR-CMCI.

The UE_A 10 may store the stored SOR-CMCI and/or the information included in the SOR-CMCI until the UE receives a new SOR-CMCI the next time, until the UE is powered off, or until a Universal Subscriber Identity Module (USIM) is removed.

While the first timer is running, the UE_A 10 receiving the first identification information may stop the first timer based on the reception of the new SOR-CMCI, set the first timer to the first timer value based on the new SOR-CMCI, and start the first timer.

In other words, in a case that the UE_A 10 selects a new first timer value while the first timer is running, the UE_A 10 may stop the running first timer and start the first timer set to the new first timer value.

Alternatively, while the first timer is running, the UE_A 10 receiving the first identification information may continue counting without stopping the running first timer in spite of the reception of the new SOR-CMCI. In that case, the UE_A 10 may update the stored old SOR-CMCI to the new SOR-CMCI, based on expiration or stopping of the first timer. In other words, while the first timer is running, the UE_A 10 receiving the first identification information may update the stored old SOR-CMCI to the new SOR-CMCI included in the first identification information after the first timer stops or expires.

The UE_A 10 receiving the second identification information and the third identification information may check whether a criterion indicated in the second identification information is included in the SOR-CMCI stored in the UE_A 10, and update a timer value associated with the criterion indicated in the second identification information of the SOR-CMCI to a timer value included in the third identification information, or additionally store the second identification information and the third identification information in the SOR-CMCI.

Specifically, for example, the UE_A 10 receiving the second identification information including the S-NSSAI_A and the third identification information including a timer value of T_A checks whether the S-NSSA_A is stored as a criterion in the stored SOR-CMCI. In a case that the S-NSSA_A is stored as a criterion in the stored SOR-CMCI, the UE_A 10 may update the timer value associated with the S-NSSAI_A to T_A. In a case that the S-NSSA_A is not stored as a criterion in the stored SOR-CMCI, the UE_A 10 may add the S-NSSAI_A to the stored SOR-CMCI in association with the timer value of T_A.

Similarly, the UE_A 10 receiving the second identification information including the DNN_A and the third identification information including the timer value of T_A checks whether the DNN_A is stored as a criterion in the stored SOR-CMCI. In a case that the DNN_A is stored as a criterion in the stored SOR-CMCI, the UE_A 10 may update the timer value associated with the DNN_A to T_A. In a case that the DNN_A is not stored as a criterion in the stored SOR-CMCI, the UE_A 10 may add the DNN_A to the stored SOR-CMCI in association with the timer value of T_A.

Similarly, the UE_A 10 receiving the second identification information including the information indicating the specific service type (for example, IMS registration related signalling) as a criterion and the third identification information including the timer value of T_A checks whether the service type is stored as a criterion in the stored SOR-CMCI. In a case that the service type is stored as a criterion in the stored SOR-CMCI, the UE_A 10 may update the timer value associated with the service type to T_A. In a case that the service type is not stored as a criterion in the stored SOR-CMCI, the UE_A 10 may add, to the stored SOR-CMCI, information indicating the service type as a criterion, in association with the timer value of T_A.

Similarly, the UE_A 10 receiving the second identification information including the information indicating matching all criteria and the third identification information including the timer value of T_A checks whether the timer value associated with the condition matching all criteria is stored in the stored SOR-CMCI. In a case that the timer value associated with the condition matching all criteria is stored in the stored SOR-CMCI, the UE_A 10 may update the timer value associated with the condition matching all criteria to T_A. In a case that the timer value associated with the condition matching all criteria is not stored in the stored SOR-CMCI, the UE_A 10 may add T_A as the timer value associated with the condition matching all criteria to the stored SOR-CMCI.

The UE_A 10 receiving the fourth identification information may recognize a kind of the value included in the second identification information, based on the third identification information. Specifically, in a case that the fourth identification information includes information indicating the S-NSSAI, the UE_A 10 may recognize that the second identification information is a value of the S-NSSAI. In a case that the fourth identification information includes information indicating the DNN, the UE_A 10 may recognize that the second identification information is a value of the DNN. In a case that the fourth identification information includes information indicating the SQL the UE_A 10 may recognize that the second identification information is a value of the SQL In a case that the fourth identification information includes information indicating a combination of the S-NSSAI and the DNN, the UE_A 10 may recognize that the second identification information includes a value of the DNN and a value of the S-NSSAI.

The UE_A 10 receiving the fourth identification information may recognize that the second identification information includes a value indicating a criterion of the PDU session attribute.

The UE_A 10 receiving the second identification information, the third identification information, and the fifth identification information may check whether a criterion indicated in the second identification information is included in the SOR-CMCI stored in the UE_A 10, and may update a timer value associated with a criterion indicated in the second identification information of the SOR-CMCI to a timer value included in the third identification information, update a priority associated with the criterion indicated in the second identification information to a value indicated in the fifth identification information, or additionally store the second identification information, the third identification information, and the fifth identification information in the stored SOR-CMCI.

The UE_A 10 receiving the first message including the SOR transport container information element, in a case of receiving information indicating that the SOR transport container information element includes the SOR-CMCI, may recognize that the SOR transport container information element includes one or more pieces of identification information of at least one among the first to fifth identification information and/or the SOR-CMCI.

Then, the UE_A 10 may transmit the second message to the AMF 140 (S602). The second message may be a registration complete message, a configuration update complete message (CONFIGURATION UPDATE COMPLETE message), or an uplink NAS transport message (UL NAS TRANSPORT message).

The UE_A 10 may determine to transmit the second message and/or determine identification information to be included in the second message, based on information included in the received first message.

Specifically, the UE_A 10 may determine to transmit the second message based on the information that is indicating that an ACK is requested and that is included in the SOR transport container information element included in the received first message.

Next, the AMF 140 may receive the second message (S602). More specifically, in a case that the UE_A 10 transmits the second message, the AMF 140 may receive the second message transmitted by the UE_A 10.

As described above, the NW may notify the UE_A 10 of the new SOR-CMCI, and the UE_A 10 may update the stored SOR-CMCI.

3.2. Second Embodiment

Hereinafter, an embodiment will be described which includes behaviors of configuring the first timer for managing the timing at which the UE_A 10 transitions from the connected mode to the idle mode, and starting and stopping the timer, and a behavior after the first timer expires. Further, an example of a behavior of the UE_A 10 while the first timer is running will be described.

First, the UE_A 10 may be in a state of storing the SOR-CMCI at least in a connected mode or a connected state. Note that the SOR-CMCI may be a preset value or may be information notified from the HPLMN.

The UE_A 10 may receive the SOR transport container information element from the AMF 140. In a case that the SOR information included in the received SOR transport container information element includes a list of recommended (or prioritized) PLMN and access technology combinations, and in a case that the received list of recommended (or prioritized) PLMN and access technology combinations includes a PLMN having a higher priority than a currently connected PLMN (Public Land Mobile Network), the UE_A 10 may select a timer value to which the first timer is to be set, set the first timer to the selected timer value, and start the first timer.

Alternatively, the UE_A 10 may, based on the PDU session establishment procedure, select a timer value to which the first timer is to be set, set the selected timer value in the first timer, and start the first timer. Specifically, the UE_A 10 may, based on the completion of the PDU session establishment using the criterion included in the SOR-CMCI, select a timer value to which the first timer is to be set, set the first timer to the selected timer value, and start the first timer.

Further, in a case that there is a running first timer, the UE_A 10 may stop the first timer based on the PDU session establishment procedure. Further, in the case that there is a running first timer, the UE_A 10 may stop the first timer and start a new first timer based on the PDU session establishment procedure.

The UE_A 10 may recognize the completion of the PDU session establishment using the criterion included in the SOR-CMCI, based on the PDU session accept message and/or the information (S-NSSAI, DNN, 5QI, etc.) associated with the PDU session included in the PDU session accept message.

In other words, the UE_A 10 may, based on the reception of the PDU session accept message, select a timer value to which the first timer is to be set, set the first timer to the selected timer value, and start the first timer.

Alternatively, the UE_A 10 may, based on moving and/or PLMN changing and/or initiating roaming, select a timer value to which the first timer is to be set, set the first timer to the selected timer value, and start the first timer.

The UE_A 10 may, not based on the trigger described above but based on other triggers, select a timer value to which the first timer is to be set, set the first timer to the selected timer value, and start the first timer.

In a case of newly starting a first timer while one or more first timers are running, the UE_A 10 may stop the running first timers or stop timing control by the running first timers.

A method of selecting a timer value to which the first timer is to be set by the UE_A 10 will be described below. The UE_A 10 uses the stored SOR-CMCI to select the timer value to which the first timer is to be set.

The UE_A 10, in a case of storing the SOR-CMCI, checks whether a PDU session matching a criterion included in the SOC-CMCI is established or whether a service indicated in a criterion is running. In a case that the PDU session matching the criterion included in the SOC-CMCI is established or in a case that the service indicated in the criterion is running, the UE_A 10 selects a timer value associated with the criterion.

Further, in the case that the PDU session matching the criterion included in the SOC-CMCI is established or in a case that a service matching the criterion is running, the UE_A 10 may set the first timer to the first timer value or may start the first timer set to the first timer.

In other words, in a case that the PDU session is established using the information included in the SOC-CMCI, or in a case that the service indicated by the information included in the SOC-CMCI is running, the UE_A 10 may set the first timer to the first timer value or may start the first timer set to the first timer.

Further, in a case that multiple criteria are included in the SOC-CMCI, and multiple PDU sessions matching the criteria included in the SOC-CMCI are established, the first timer set to the first timer may be started for each PDU session. Further, in a case that multiple criteria are included in the SOC-CMCI, and multiple services matching the criteria included in the SOC-CMCI are running, the first timer set to the first timer is set may be started for each service.

In other words, in a case that multiple criteria are included in the SOC-CMCI, and multiple PDU sessions using the information included in the SOC-CMCI are established, the UE_A 10 may start the first timer set to the first timer for each PDU session. Further, in a case that multiple criteria are included in the SOC-CMCI, and multiple services indicated by the information included in the SOC-CMCI are running, the UE_A 10 may start the first timer set to the first timer for each service.

Further, in a case that multiple pieces of SOC-CMCI are received, and multiple PDU sessions matching the criteria included in the SOC-CMCI are established, the first timer set to the first timer may be started for each PDU session. Further, in a case that multiple pieces of SOC-CMCI are received, and multiple services matching the criteria included in the SOC-CMCI are running, the first timer set to the first timer may be started for each service.

In other words, in a case that multiple pieces of SOC-CMCI are received, and multiple PDU sessions using the information included in the SOC-CMCI are established, the UE_A 10 may start the first timer set to the first timer for each PDU session. Further, in a case that multiple pieces of SOC-CMCI are received, and multiple services indicated by the information included in the SOC-CMCI are running, the UE_A 10 may start the first timer set to the first timer for each service.

Conversely, in a case that the PDU session matching the criterion included in the SOC-CMCI is not established, or in a case that the service matching the criterion is not running, the UE_A 10 may perform a deregistration procedure.

In other words, in a case that the PDU session is not established using the information included in the SOC-CMCI, or in a case that the service indicated by the information included in the SOC-CMCI is not running, the UE_A 10 may perform the deregistration procedure.

Further, the UE_A 10 may perform the above behavior, based on receiving the first message including one or more pieces of identification information among the first to fifth identification information.

More specifically, in a case that the UE_A 10 receives the first message including one or more pieces of identification information among the first to fifth identification information in a state in which the PDU session matching the criterion included in the SOC-CMCI is established, the UE_A 10 may set the first timer to the first timer value or may start the first timer set to the first timer. Further, in a case that the UE_A 10 receives the first message including one or more pieces of identification information among the first to fifth identification information in a state in which the service matching the criterion included in the SOC-CMCI is running, the UE_A 10 may set the first timer to the first timer value or may start the first timer set to the first timer.

In other words, in a case that the UE_A 10 receives the first message including one or more pieces of identification information among the first to fifth identification information in a state in which the PDU session is established using the information included in the SOC-CMCI, the UE_A 10 may set the first timer to the first timer value or may start the first timer set to the first timer. Further, in a case that the UE_A 10 receives the first message including one or more pieces of identification information among the first to fifth identification information in a state in which the service indicated by the information included in the SOC-CMCI is running, the UE_A 10 may set the first timer to the first timer value or may start the first timer set to the first timer.

Further, in a case of receiving the first message including one or more pieces of identification information among the first to fifth identification information in a state in which multiple criteria are included in the SOC-CMCI and multiple PDU sessions matching the criteria included in the SOC-CMCI are established, the first timer set to the first timer may be started for each PDU session. Furthermore, in a case of receiving the first message including one or more pieces of identification information among the first to fifth identification information in a state in which multiple criteria are included in the SOC-CMCI and multiple services matching the criteria included in the SOC-CMCI are running, the first timer set to the first timer may be started for each service.

In other words, in a case of receiving the first message including one or more pieces of identification information among the first to fifth identification information in a state in which multiple criteria are included in the SOC-CMCI, and multiple PDU sessions using the information included in the SOC-CMCI are established, the UE_A 10 may start the first timer set to the first timer for each PDU session. Furthermore, in a case of receiving the first message including one or more pieces of identification information among the first to fifth identification information in a state in which multiple criteria are included in the SOC-CMCI and multiple services indicated by the information included in the SOC-CMCI are running, the UE_A 10 may start the first timer set to the first timer for each service.

Further, in a case of receiving the first message including one or more pieces of identification information among the first to fifth identification information in the state in which multiple pieces of SOC-CMCI are received, and multiple PDU sessions matching the criteria included in the SOC-CMCI are established, the first timer set to the first timer may be started for each PDU session. Furthermore, in a case of receiving the first message including one or more pieces of identification information among the first to fifth identification information in a state in which multiple pieces of SOC-CMCI are received and multiple services matching the criteria included in the SOC-CMCI are running, the first timer set to the first timer may be started for each service.

In other words, in a case of receiving the first message including one or more pieces of identification information among the first to fifth identification information in a state in which multiple pieces of SOC-CMCI are received and multiple PDU sessions using the information included in the SOC-CMCI are established, the UE_A 10 may start the first timer set to the first timer for each PDU session. Furthermore, in a case of receiving the first message including one or more pieces of identification information among the first to fifth identification information in a state in which multiple pieces of SOC-CMCI are received and multiple services indicated by the information included in the SOC-CMCI are running, the UE_A 10 may start the first timer set to the first timer for each service.

Conversely, in a case that the UE_A 10 receives the first message including one or more pieces of identification information among the first to fifth identification information in a state in which the PDU session matching the criterion included in the SOC-CMCI is not established, the UE_A 10 may perform the deregistration procedure. Further, in a case that the UE_A 10 receives the first message including one or more pieces of identification information among the first to fifth identification information in a state in which the service matching the criterion included in the SOC-CMCI is not running, the UE_A 10 may perform the deregistration procedure.

In other words, in a case that the UE_A 10 receives the first message including one or more pieces of identification information among the first to fifth identification information in a state in which the PDU session is not established using the information included in the SOC-CMCI, the UE_A 10 may perform the deregistration procedure. Further, in a case that the UE_A 10 receives the first message including one or more pieces of identification information among the first to fifth identification information in a state in which the service indicated by the information included in the SOC-CMCI is not running, the UE_A 10 may perform the deregistration procedure.

Note that, in a case that multiple criteria match one PDU session, the UE_A 10 may select the largest timer value among the timer values associated with the respective criteria.

In a case that the priority is included in the SOR-CMCI stored in the UE_A 10, the UE_A 10 may select the timer value to which the first timer is to be set based on the priority.

Further, in the case that the UE_A 10 receives the first message including one or more pieces of identification information among the first to fifth identification information, the UE_A 10 may select the timer value to which the first timer is to be set based on the priority, or set the first timer to the selected timer value.

In a case that the UE_A 10 stores multiple priorities of the same value, the UE_A 10 may select the largest timer value among the timer values having the same priority.

Further, in a case that the UE_A 10 receives the first message including one or more pieces of identification information among the first to fifth identification information, and there are multiple priorities indicating the same value, the UE_A 10 may select the largest value among the timer values associated with the priorities as the first timer value, or may set the first timer to the selected timer value.

Furthermore, the UE_A 10 may select the first timer value based on the priority included in each criterion, and set the first timer to the selected first timer value, or start the first timer set to the selected first timer.

Specifically, in the case that multiple criteria are included in the SOC-CMCI, and multiple PDU sessions matching the criteria included in the SOC-CMCI are established, the UE_A 10 may select the first timer value based on the priority included in each criterion, and set the first timer to the selected first timer value, or start the first timer set to the selected first timer. Further, also in the case that multiple criteria are included in the SOC-CMCI, and multiple services matching the criteria included in the SOC-CMCI are running, the UE_A 10 may select the first timer value based on the priority included in each criterion, and set the first timer to the selected first timer value, or start the first timer set to the selected first timer.

In other words, in the case that multiple criteria are included in the SOC-CMCI, and multiple PDU sessions using the information included in the SOC-CMCI are established, the UE_A 10 may select the first timer value based on the priority included in each criterion, and set the first timer to the selected first timer value, or start the first timer set to the selected first timer. Further, also in the case that multiple criteria are included in the SOC-CMCI, and multiple services indicated by the information included in the SOC-CMCI are running, the UE_A 10 may select the first timer value based on the priority included in each criterion, and set the first timer to the selected first timer value, or start the first timer set to the selected first timer.

Here, the UE_A 10 may realize the selection of the first timer value based on the priority included in each criterion by comparing the priorities included in the criteria, extracting the criterion having the highest priority, and selecting the first timer value associated with the extracted criterion.

Note that, in a case that multiple criteria having the highest priority are extracted as a result of comparing the priorities included in the criteria, the UE_A 10 may select the largest value among the first timer values associated with the extracted criteria as the first timer value. Furthermore, in this case, the UE_A 10 may set the first timer to the selected first timer value, or start the first timer set to the selected first timer.

Furthermore, the UE_A 10 may select the first timer value based on the priority included in each piece of SOC-CMCI, and set the first timer to the selected first timer value, or start the first timer set to the selected first timer.

Specifically, in the case that multiple pieces of SOC-CMCI are received, and multiple PDU sessions matching the criteria included in the SOC-CMCI are established, the UE_A 10 may select the first timer value based on the priority included in each piece of SOC-CMCI, and set the first timer to the selected first timer value, or start the first timer set to the selected first timer. Further, also in the case that multiple pieces of SOC-CMCI are received, and multiple services matching the criteria included in the SOC-CMCI are running, the UE_A 10 may select the first timer value based on the priority included in each piece of SOC-CMCI, and set the first timer to the selected first timer value, or start the first timer set to the selected first timer.

In other words, in the case that multiple pieces of SOC-CMCI are received, and multiple PDU sessions using the information included in the SOC-CMCI are established, the UE_A 10 may select the first timer value based on the priority included in each piece of SOC-CMCI, and set the first timer to the selected first timer value, or start the first timer set to the selected first timer. Further, also in the case that multiple pieces of SOC-CMCI are received, and multiple services indicated by the information included in the SOC-CMCI are running, the UE_A 10 may select the first timer value based on the priority included in each piece of SOC-CMCI, and set the first timer to the selected first timer value, or start the first timer set to the selected first timer.

Here, the UE_A 10 may realize the selection of the first timer value based on the priority included in each criterion by comparing the priorities included in the pieces of SOC-CMCI, extracting the SOC-CMCI having the highest priority, and selecting the first timer value included in the extracted SOC-CMCI.

Note that, in a case that multiple pieces of SOC-CMCI having the highest priority are extracted as a result of comparing the priorities included in the pieces of SOC-CMCI, the UE_A 10 may select the largest value among the first timer values associated with the extracted pieces of SOC-CMCI as the first timer value. Furthermore, in this case, the UE_A 10 may configure the selected first timer value in the first timer, or start the first timer set to the selected first timer.

Further, the UE_A 10 may perform the above behavior, based on receiving the first message including one or more pieces of identification information among the first to fifth identification information.

To be more specific, in the case that the UE_A 10 receives the first message including one or more pieces of identification information among the first to fifth identification information, the UE_A 10 may select the first timer value based on the priority included in each criterion, and set the first timer to the selected first timer value, or start the first timer set to the selected first timer.

Specifically, in the case of receiving the first message including one or more pieces of identification information among the first to fifth identification information in the state in which multiple criteria are included in the SOC-CMCI and multiple PDU sessions matching the criteria included in the SOC-CMCI are established, the UE_A 10 may select the first timer value based on the priority included in each criterion, and set the first timer to the selected first timer value, or start the first timer set to the selected first timer. Further, also in the case of receiving the first message including one or more pieces of identification information among the first to fifth identification information in the state in which multiple criteria are included in the SOC-CMCI and multiple services matching the criteria included in the SOC-CMCI are running, the UE_A 10 may select the first timer value based on the priority included in each criterion, and set the first timer to the selected first timer value, or start the first timer set to the selected first timer.

In other words, in the case of receiving the first message including one or more pieces of identification information among the first to fifth identification information in the state in which multiple criteria are included in the SOC-CMCI, and multiple PDU sessions using the information included in the SOC-CMCI are established, the UE_A 10 may select the first timer value based on the priority included in each criterion, and set the first timer to the selected first timer value, or start the first timer set to the selected first timer. Further, also in the case of receiving the first message including one or more pieces of identification information among the first to fifth identification information in the state in which multiple criteria are included in the SOC-CMCI and multiple services indicated by the information included in the SOC-CMCI are running, the UE_A 10 may select the first timer value based on the priority included in each criterion, and set the first timer to the selected first timer value, or start the first timer set to the selected first timer.

Here, the UE_A 10 may realize the selection of the first timer value based on the priority included in each criterion by comparing the priorities included in the criteria, extracting the criterion having the highest priority, and selecting the first timer value associated with the extracted criterion.

Note that, in a case that the UE_A 10 receives the first message including one or more pieces of identification information among the first to fifth identification information in a state in which multiple criteria having the highest priority are extracted as a result of comparing the priorities included in the criteria, the UE_A 10 may select the largest value among the first timer values associated with the extracted criteria as the first timer value. Further, in this state, in the case of receiving the first message including one or more pieces of identification information among the first to fifth identification information, the UE_A 10 may set the first timer to the selected first timer value, or start the first timer set to the selected first timer.

Furthermore, in the case that the UE_A 10 receives the first message including one or more pieces of identification information among the first to fifth identification information, the UE_A 10 may select the first timer value based on the priority included in each piece of SOC-CMCI, and set the first timer to the selected first timer value, or start the first timer set to the selected first timer.

Specifically, in the case of receiving the first message including one or more pieces of identification information among the first to fifth identification information in the state in which multiple pieces of SOC-CMCI are received, and multiple PDU sessions matching the criteria included in the SOC-CMCI are established, the UE_A 10 may select the first timer value based on the priority included in each piece of SOC-CMCI, and set the first timer to the selected first timer value, or start the first timer set to the selected first timer. Further, also in the case of receiving the first message including one or more pieces of identification information among the first to fifth identification information in the state in which multiple pieces of SOC-CMCI are received and multiple services matching the criteria included in the SOC-CMCI are running, the UE_A 10 may select the first timer value based on the priority included in each piece of SOC-CMCI, and set the first timer to the selected first timer value, or start the first timer set to the selected first timer.

In other words, in the case of receiving the first message including one or more pieces of identification information among the first to fifth identification information in the state in which multiple pieces of SOC-CMCI are received and multiple PDU sessions using the information included in the SOC-CMCI are established, the UE_A 10 may select the first timer value based on the priority included in each piece of SOC-CMCI, and set the first timer to the selected first timer value, or start the first timer set to the selected first timer. Further, also in the case of receiving the first message including one or more pieces of identification information among the first to fifth identification information in the state in which multiple pieces of SOC-CMCI are received and multiple services indicated by the information included in the SOC-CMCI are running, the UE_A 10 may select the first timer value based on the priority included in each piece of SOC-CMCI, and set the first timer to the selected first timer value, or start the first timer set to the selected first timer.

Here, the UE_A 10 may realize the selection of the first timer value based on the priority included in each criterion by comparing the priorities included in the pieces of SOC-CMCI, extracting the SOC-CMCI having the highest priority, and selecting the first timer value included in the extracted SOC-CMCI.

Note that, in a case that the UE_A 10 receives the first message including one or more pieces of identification information among the first to fifth identification information in a state in which multiple pieces of SOC-CMCI having the highest priority are extracted as a result of comparing the priorities included in the pieces of SOC-CMCI, the UE_A 10 may select the largest value among the first timer values associated with the extracted pieces of SOC-CMCI as the first timer value. Further, in this state, in the case of receiving the first message including one or more pieces of identification information among the first to fifth identification information, the UE_A 10 may set the first timer to the selected first timer value, or start the first timer set to the selected first timer.

In a case that multiple criteria match multiple PDU sessions, the UE_A 10 may select the timer value based on the priorities associated with the criteria. Alternatively, in the case that multiple criteria match multiple PDU sessions, the UE_A 10 may select the largest one of the timer values associated with all matching criteria.

Alternatively, in the case that multiple criteria match multiple PDU sessions, the maximum timer value associated with the criteria matching each PDU session may be selected and each timer may be started. That is, the UE_A 10 may simultaneously run the timers associated with the PDU sessions. In other words, in a case that the UE_A 10 has multiple PDU sessions, the UE_A 10 may run and manage multiple first timers.

In a case that the criterion included in the SOR-CMCI is a criterion belonging to a PDU session, and that a PDU session using information included in the criterion belonging to the PDU session is established, the UE_A 10 may select a timer value associated with the criterion.

In a case that S-NSSAI_A is included in the SOR-CMCI stored in the UE_A 10, the UE_A 10 checks whether there is a PDU session using the S-NSSAI_A among the PDU sessions being currently established. In a case that the PDU session using the S-NSSAI_A is being established, the first timer is set to the timer value associated with the S-NS SAI A.

In other words, in a case that the S-NSSAI_A for the PDU session being established matches the criteria information, the UE_A 10 may set the first timer value to the first timer value associated with the criteria information, or start the first timer.

Here, in a case that the first timer is managed per PDU session, the first timer associated with the PDU session using the S-NSSAI_A may be set to the selected timer value. In a case that the first timer is managed per access, the first timer associated with the access type associated with the PDU session using the S-NSSAI_A may be set to the selected timer value.

In a case that a DNN_A is included in the SOR-CMCI stored in the UE_A 10, the UE_A 10 checks whether there is a PDU session using the DNN_A among the PDU sessions being currently established. In a case that the PDU session using the DNN_A is being established, the first timer is set to the timer value associated with the DNN_A.

In other words, in a case that the DNN_A for the PDU session being established matches the criteria information, the UE_A 10 may set the first timer value to the first timer value associated with the criteria information, or start the first timer.

Here, in a case that the first timer is managed per PDU session, the first timer associated with the PDU session using the DNN_A may be set to the selected timer value. In a case that the first timer is managed per access, the first timer associated with the access type associated with the PDU session using the DNN_A may be set to the selected timer value.

In a case that a 5QI_A is included in the SOR-CMCI stored in the UE_A 10, the UE_A 10 checks whether there is a PDU session using the 5QI_A among the PDU sessions being currently established. In a case that the PDU session using the 5QI_A is being established, the first timer is set to the timer value associated with the 5QI_A.

In other words, in a case that the 5QI_A for the PDU session being established matches the criteria information, the UE_A 10 may set the first timer value to the first timer value associated with the criteria information, or start the first timer.

Here, in a case that the first timer is managed per PDU session, the first timer associated with the PDU session using the 5QI_A may be set to the selected timer value. In a case that the first timer is managed per access, the first timer associated with the access type associated with the PDU session using the 5QI_A may be set to the selected timer value.

In a case that information indicating an access type (3GPP access or non-3GPP access) is included in the SOR-CMCI stored in the UE_A 10, the UE_A 10 checks whether there is a PDU session over the access indicated by the access type among the PDU sessions being currently established. In a case that the PDU session over the access is being established, the first timer is set to the timer value associated with the access.

In other words, in a case that the access type for the PDU session being established matches the criteria information, the UE_A 10 may set the first timer value to the first timer value associated with the criteria information, or start the first timer.

Here, in a case that the first timer is managed per PDU session, the first timer associated with the PDU session over the access may be set to the selected timer value. In a case that the first timer is managed per access, the first timer associated with the access type included in the SOR-CMCI may be set to the selected timer value.

In a case that information indicating a PDU session type (such as IPv4, IPv6, Ethernet, and Unstructured) is included in the SOR-CMCI stored in the UE_A 10, the UE_A 10 checks whether there is a PDU session of a type indicated by the PDU session type among the PDU sessions being currently established. In a case that the PDU session of the type indicated by the PDU session type is being established, the first timer is set to the timer value associated with the PDU session type.

In other words, in a case that the PDU session type of the PDU session being established matches the criteria information, the UE_A 10 may set the first timer value to the first timer value associated with the criteria information, or start the first timer.

Here, in a case that the first timer is managed per PDU session, the first timer associated with the PDU session of the type indicated by the PDU session type may be set to the selected timer value. In a case that the first timer is managed per access, the first timer associated with the access type associated with the PDU session of the type indicated by the PDU session type may be set to the selected timer value.

In a case that a PDU session ID_A is included in the SOR-CMCI stored in the UE_A 10, the UE_A 10 checks whether there is a PDU session identified by the PDU session ID_A among the PDU sessions being currently established. In a case that the PDU session identified by the PDU session ID_A is being established, the first timer is set to the timer value associated with the PDU session ID_A.

In other words, in a case that the PDU session ID_A of the PDU session being established matches the criteria information, the UE_A 10 may set the first timer value to the first timer value associated with the criteria information, or start the first timer.

Here, in a case that the first timer is managed per PDU session, the first timer associated with the PDU session identified by the PDU session ID_A may be set to the selected timer value. In a case that the first timer is managed per access, the first timer associated with the access type associated with the PDU session identified by the PDU session ID_A may be set to the selected timer value.

In a case that multiple pieces of information belonging to the PDU session are included in the criterion belonging to the PDU session included in the SOR-CMCI stored in the UE_A 10, the UE_A 10 may consider that a combination of the multiple pieces of information is one criterion.

Specifically, in a case that S-NSSAI_A and a DNN_A are included in the criterion belonging to the PDU session included in one piece of SOR-CMCI stored in the UE_A 10, the UE_A 10 checks whether there is a PDU session using the S-NSSAI_A and the DNN_A among the PDU sessions being currently established. In a case that the PDU session using the S-NSSAI_A and the DNN_A is being established, the first timer is set to the timer value associated with the criterion belonging to the PDU session.

Here, in a case that the first timer is managed per PDU session, the first timer associated with the PDU session using the S-NSSAI_A and the DNN_A may be set to the selected timer value. In a case that the first timer is managed per access, the first timer associated with the access type associated with the PDU session using the S-NSSAI_A and the DNN_A may be set to the selected timer value.

Also, in a case that a combination of multiple pieces of information belonging to another PDU session is included in the criterion belonging to the PDU session included in the SOR-CMCI, the UE_A 10 may similarly check whether a PDU session matching the combination of the multiple pieces of information belonging to the PDU session is established. In a case that the corresponding PDU session is established, the UE_A 10 may set the first timer to the timer value associated with the criterion belonging to the PDU session.

In a case that new SOR-CMCI is received while the first timer is running, and further that a timer value included in the new SOR-CMCI is greater than the timer value set to the first timer value, the UE_A 10 may stop the running first timer value, set the first timer value to the timer value included in the new SOR-CMCI, and newly start the first timer.

On the other hand, in the case that new SOR-CMCI is received while the first timer is running, and further that a timer value included in the new SOR-CMCI is smaller than the timer value set to the first timer value, the UE_A 10 neither stop the running first timer value, set the first timer value to the timer value included in the new SOR-CMCI, nor newly start the first timer.

Specific examples are as follows. In the case of receiving new SOR-CMCI while the first timer is running, the UE_A 10 checks whether a PDU session matching the criterion included in the new SOR-CMCI is being established or whether a service matching the service type criterion included in the new SOR-CMCI is running.

In a case that the PDU session matching the criterion included in the new SOR-CMCI is being established, or the service matching the service type criterion included in the new SOR-CMCI is running, the timer value associated with the criterion is compared to the timer value set to the currently running first timer. In a case that the timer value associated with the criterion included in the above-described new SOR-CMCI is greater, the UE_A 10 may stop the running first timer value, set the first timer value to a newly selected timer value, and newly start the first timer. In a case that the timer value associated with the criterion included in the above-described new SOR-CMCI is smaller, the UE_A 10 need neither stop the running first timer value, neither set the first timer to the selected new timer value, nor start the selected new first timer value.

Alternatively, in the case that the PDU session matching the criterion included in the new SOR-CMCI is being established, or the service matching the service type criterion included in the new SOR-CMCI is running, the timer value associated with the criterion is compared to the value of the currently running first timer. In the case that the timer value associated with the criterion included in the above-described new SOR-CMCI is smaller, the UE_A 10 need neither stop the running first timer value, neither set the first timer to the selected new timer value, nor start the selected new first timer value.

In the case that new SOR-CMCI is received while the first timer is running, and further that a priority included in the new SOR-CMCI is higher than a priority of the timer value set to the running first timer value or a priority associated with the criterion together with the timer value set to the running first timer value, the UE_A 10 may stop the running first timer value, set the first timer value to the timer value included in the new SOR-CMCI, and newly start the first timer.

On the other hand, in the case that new SOR-CMCI is received while the first timer is running, and further that a priority included in the new SOR-CMCI is lower than a priority of the timer value set to the running first timer value or a priority associated with the criterion together with the timer value set to the running first timer value, the UE_A 10 neither stop the running first timer value, neither set the first timer value to the timer value included in the new SOR-CMCI, nor newly start the first timer.

Specific examples are as follows. In the case of receiving a new SOR-CMCI while the first timer is running, the UE_A 10 checks whether a PDU session matching the criterion included in the new SOR-CMCI is being established or whether a service matching the service type criterion included in the new SOR-CMCI is running.

In a case that the PDU session matching the criterion included in the new SOR-CMCI is being established, or the service matching the service type criterion included in the new SOR-CMCI is running, the priority associated with the criterion is compared to the priority of timer value set to the currently running first timer, or the priority associated with the criterion together with the timer value set to the running first timer value. In a case that the priority associated with the criterion included in the above-described new SOR-CMCI is higher (preceding), the UE_A 10 may stop the running first timer value, set the first timer value to a newly selected timer value, and newly start the first timer. In a case that the priority associated with the criterion included in the above-described new SOR-CMCI is lower (not preceding), the UE_A 10 need neither stop the running first timer value, neither set the first timer to the selected new timer value, nor start the selected new timer value.

Alternatively, in the case that the PDU session matching the criterion included in the new SOR-CMCI is being established, or the service matching the service type criterion included in the new SOR-CMCI is running, the timer value associated with the criterion is compared to the value of the currently running first timer. In the case that the timer value associated with the criterion included in the above-described new SOR-CMCI is smaller, the UE_A 10 need neither stop the running first timer value, neither set the first timer to the selected new timer value, nor start the selected new timer value.

In a case that a mode of the UE in the PLMN selection is switched from the automatic network selection mode to the manual network selection mode while the first timer is running, the UE_A 10 may stop the running first timer, and/or stop the timing control of transition to the idle mode by the NW.

In that case, the UE_A 10 may notify the core network and/or the core network apparatus such as the AMF of a control message notifying that the mode of the UE in the PLMN selection is switched from the automatic network selection mode to the manual network selection mode and/or that the running first timer is stopped and/or that the timing control of transition to the idle mode by the NW is stopped.

The UE_A 10, while the first timer is running, may be controlled to be not able to transmit the PDU session establishment request message for establishing a PDU session other than an emergency PDU session to the same S-NSSAI and/or the same DNN and/or the same PLMN corresponding to the PDU session established by the UE_A 10 until the first timer expires or the first timer is stopped.

In other words, the UE_A 10, while the first timer is running, may be able to transmit the PDU session establishment request message to S-NSSAI other than the same S-NSSAI and/or a DNN other than the same DNN and/or a PLMN other than the same PLMN corresponding to the PDU session established by the UE_A 10 or may be controlled to be able to transmit the PDU session establishment request message for establishing an emergency PDU session regardless of the requested S-NSSAI, DNN, or PLMN, until the first timer expires or the first timer is stopped.

In still other words, the UE_A 10 may be prohibited from transmitting the PDU session establishment request message using the same information as the information included in the criteria information associated with the first timer until the first timer expires or until the first timer is stopped. Further, the UE_A 10 may be configured to be prohibited from transmitting the PDU session establishment request message using the same information as the information included in the criteria information associated with the first timer until the first timer expires or until the first timer is stopped.

Further, the UE_A 10 may be prohibited from initiating the PDU session establishment procedure using the same information as the information included in the criteria information associated with the first timer until the first timer expires or until the first timer is stopped. Further, the UE_A 10 may be configured to be prohibited from initiating the PDU session establishment procedure using the same information as the information included in the criteria information associated with the first timer until the first timer expires or until the first timer is stopped.

Here, the information included in the criteria information associated with the first timer may be one or more pieces of information of S-NSSAI_A, DNN_A, 5QI_A, access type, PDU session type, and PDU session ID_A.

Further, the UE_A 10 may be allowed to transmit only the PDU session establishment request message using the information indicating an emergency PDU session until the first timer expires or until the first timer is stopped. Further, the UE_A 10 may be configured to be allowed to transmit only the PDU session establishment request message using the information indicating an emergency PDU session until the first timer expires or until the first timer is stopped.

Further, the UE_A 10 may be allowed to initiate only the PDU session establishment procedure for establishing an emergency PDU session until the first timer expires or until the first timer is stopped. Further, the UE_A 10 may be configured to be allowed to initiate only the PDU session establishment procedure for establishing an emergency PDU session until the first timer expires or until the first timer is stopped.

The UE_A 10, while the first timer is running, may be controlled to be not able to initiate to establish a PDU session, other than an emergency PDU session, for PDU session establishment using each criterion included in the SOR-CMCI stored in the UE_A 10 until the first timer expires or until the first timer is stopped.

Alternatively, the UE_A 10, while the first timer is running, need not be controlled concerning the procedure for PDU session establishment, and may be allowed to transmit all PDU session establishment request messages for PDU session establishment.

In other words, the UE_A 10 may be allowed to transmit the PDU session establishment request message using the same information as the information included in the criteria information associated with the first timer even before the first timer expires or before the first timer is stopped. Furthermore, the UE_A 10 may be configured to be allowed to transmit the PDU session establishment request message using the same information as the information included in the criteria information associated with the first timer even before the first timer expires or before the first timer is stopped.

Further, the UE_A 10 may be allowed to initiate the PDU session establishment procedure using the same information as the information included in the criteria information associated with the first timer even before the first timer expires or before the first timer is stopped. Furthermore, the UE_A 10 may be configured to be allowed to initiate the PDU session establishment procedure using the same information as the information included in the criteria information associated with the first timer even before the first timer expires or before the first timer is stopped.

The UE_A 10, while the first timer is running, may be stopped running the first timer, based on release of the PDU session associated with the first timer or stop of the service associated with the first timer.

The NW, while the first timer is running, may initiate a procedure for release of the PDU session associated with the first timer to immediately stop the first timer, and to indicate that the UE_A 10 releases all the established PDU sessions and transitions to the idle mode for the SOR.

The UE_A 10 performs the deregistration procedure to release all the established PDU sessions and transition to the idle mode, based on expiration or stopping of the first timer. The expiration of the first timer means that the value of the first timer becomes 0. A case where the first timer is set to the timer value 0 may be processed in the same manner as the case where the first timer expires.

More specifically, the UE_A 10 may perform the deregistration procedure to release all the established PDU sessions and transition to the idle mode, based on the expiration or stopping of all the first timers. Note that, in spite of the expiration or stopping of the first timers, the UE_A 10 need not release the PDU session or transition to the idle mode in a case that another first timer is running.

"The UE transitions to the idle mode" means that the UE in the connected mode enters a state in the idle mode.

In the case that the first timer is stopped based on the reception of the new SOR-CMCI or in the case that the first timer is stopped due to the change of the mode of the UE in the PLMN selection, the transition to the idle mode by performing the deregistration procedure need not be requested.

In a case that the UE_A 10 establishes an emergency PDU session, even in a case that the first timer expires or stops, the transition to the idle mode by performing the deregistration procedure need not be requested.

Note that, in a case that the UE_A 10 runs multiple first timers, in a case that all the first timers expire and/or stop, the UE_A 10 may release all the established PDU sessions and transition to the idle mode.

The UE_A 10 may release all the established PDU sessions and transition to the idle mode for the SOR. The UE having transitioned to the idle mode may select a PLMN with a high priority and attempt to acquire a service for the selected PLMN.

Information included in the SOR information notified from the NW may be used for the PLMN selection.

4. MODIFICATIONS

A program running on an apparatus according to an aspect of the present invention may serve as a program that controls a Central Processing Unit (CPU) and the like to cause a computer to function in such a manner as to realize the functions of the embodiment according to the aspect of the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, it is possible for one or multiple aspects of the present invention to use a new integrated circuit based on the technology.

A User Equipment (UE) according to an embodiment of the present invention includes transmission and reception circuitry and a controller. The transmission and reception circuitry receives a Steering of roaming connected mode control information (SOR-CMCI) including a first timer value from a core network. The controller sets a first timer included in the UE to the first timer value to start the first timer. While the first timer is running, in a case of receiving a new SOR-CMCI, the controller stops the first timer.

In the User Equipment (UE) according to an embodiment of the present invention, while the first timer is running, in a case that the new SOR-CMCI includes a second timer value and the second timer value is larger than the first timer value, the controller stops the first timer and sets the first timer to a second timer value to start the first timer. While the first timer is running, in a case that the new SOR-CMCI includes a second timer value and the second timer value is smaller than the first timer value, the controller does not set the second timer value in the first timer.

In the User Equipment (UE) according to an embodiment of the present invention, the controller stops the first timer in a case of being switched from the automatic network selection mode to the manual network selection mode.

In the User Equipment (UE) according to an embodiment of the present invention, the transmission and reception circuitry receives a Steering of Roaming (SOR) transport container information element. In a case that the SOR transport container information element includes a Public Land Mobile Network (PLMN) having a higher priority than a PLMN to which the UE is currently connected, the transmission and reception circuitry sets the first timer to the first timer value to start the first timer.

In the User Equipment (UE) according to an embodiment of the present invention, in a case that a PDU session is established using information matching a criterion included in the SOR-CMCI, the controller sets the first timer to the first timer value to start the first timer.

In the User Equipment (UE) according to an embodiment of the present invention, the transmission and reception circuitry is not allowed to transmit a PDU session establishment request message for establishing a PDU session other than an emergency PDU session, but is allowed to transmit a PDU session establishment request message for establishing an emergency PDU session to the same S-NSSAI and/or the same DNN corresponding to the established PDU session until the first timer expires.

Note that, the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects are substituted for one another is also included.

REFERENCE SIGNS LIST

1 Mobile communication system
10 UE_A
30 PGW-U
32 PGW-C
35 SGW
40 MME
45 eNB
50 HSS
60 PCRF

47

80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE) comprising:
transmission and reception circuitry; and
a controller,
wherein
the transmission and reception circuitry is configured to receive a Non-Access-Stratum (NAS) message including Steering of roaming connected mode control information (SOR-CMCI),
the SOR-CMCI includes a plurality of criteria and a plurality of timer values,
the plurality of criteria includes a first criterion and a second criterion,
the plurality of timer values includes a first timer value and a second timer value,
the first timer value is associated with the first criterion,
the second timer value is associated with the second criterion,
in a case that there are the first criterion and the second criterion applicable to a plurality of protocol data unit (PDU) sessions, the controller is configured to start a first Tsor-cm timer set to the first timer value and a second Tsor-cm timer set to the second timer value, and

the controller is further configured to stop the first Tsor-cm timer and the second Tsor-cm timer in response to determining that the controller switches from an automatic network selection mode to a manual network selection mode while the first Tsor-cm timer and the second Tsor-cm timer are running.

2. A method performed by a User Equipment (UE), the method comprising:
receiving a Non-Access-Stratum (NAS) message including Steering of roaming connected mode control information (SOR-CMCI),
wherein
the SOR-CMCI includes a plurality of criteria and a plurality of timer values,
the plurality of criteria includes a first criterion and a second criterion,
the plurality of timer values includes a first timer value and a second timer value,
the first timer value is associated with the first criterion, and
the second timer value is associated with the second criterion;
in a case that there are the first criterion and the second criterion applicable to a plurality of protocol data unit (PDU) sessions, starting a first Tsor-cm timer set to the first timer value and a second Tsor-cm timer set to the second timer value; and
stopping the first Tsor-cm timer and the second Tsor-cm timer in response to determining that the UE switches from an automatic network selection mode to a manual network selection mode while the first Tsor-cm timer and the second Tsor-cm timer are running.

* * * * *